(12) United States Patent
Natoli et al.

(10) Patent No.: US 9,002,729 B2
(45) Date of Patent: Apr. 7, 2015

(54) SYSTEM AND METHOD FOR DETERMINING SETS OF ONLINE ADVERTISEMENT TREATMENTS USING CONFIDENCES

(75) Inventors: Claudio Natoli, Glenwood (AU); Shane Murray, Neutral Bay (AU); Jong-won Choi, Arlarmon (AU)

(73) Assignee: Accenture Global Services Limited, Dublin (IE)

( * ) Notice: Subject to any disclaimer, the term of this patent is extended or adjusted under 35 U.S.C. 154(b) by 868 days.

(21) Appl. No.: 12/255,071

(22) Filed: Oct. 21, 2008

(65) Prior Publication Data

US 2010/0100419 A1    Apr. 22, 2010

(51) Int. Cl.
*G06Q 10/00* (2012.01)
*G06Q 30/02* (2012.01)

(52) U.S. Cl.
CPC ............ *G06Q 30/02* (2013.01); *G06Q 30/0202* (2013.01)

(58) Field of Classification Search
USPC .................................. 705/14.4, 14.41, 14.43
See application file for complete search history.

(56) References Cited

U.S. PATENT DOCUMENTS

| | | | |
|---|---|---|---|
| 5,124,911 A | 6/1992 | Sack | |
| 5,515,270 A * | 5/1996 | Weinblatt | 705/14.25 |
| 5,809,242 A | 9/1998 | Shaw et al. | |
| 5,848,396 A | 12/1998 | Gerace | |
| 5,872,850 A | 2/1999 | Klein et al. | |
| 5,918,014 A | 6/1999 | Robinson | |
| 5,968,125 A | 10/1999 | Garrick et al. | |
| 6,020,883 A | 2/2000 | Herz | |
| 6,029,195 A | 2/2000 | Herz | |
| 6,430,539 B1 | 8/2002 | Lazarus et al. | |
| 6,460,036 B1 | 10/2002 | Herz | |
| 6,934,748 B1 * | 8/2005 | Louviere et al. | 709/224 |
| 7,031,932 B1 * | 4/2006 | Lipsky et al. | 705/14.41 |
| 7,100,111 B2 * | 8/2006 | McElfresh et al. | 715/207 |
| 7,284,008 B2 * | 10/2007 | Henkin et al. | 1/1 |
| 7,308,497 B2 * | 12/2007 | Louviere et al. | 709/224 |
| 7,366,683 B2 * | 4/2008 | Altberg et al. | 705/14.64 |
| 7,548,929 B2 * | 6/2009 | Collins et al. | 1/1 |
| 7,653,627 B2 * | 1/2010 | Li et al. | 707/999.007 |
| 7,664,670 B1 * | 2/2010 | Weiss | 705/7.32 |
| 7,747,465 B2 * | 6/2010 | Srinivasan et al. | 705/14.4 |
| 7,840,438 B2 * | 11/2010 | Carson et al. | 705/14.4 |

(Continued)

FOREIGN PATENT DOCUMENTS

| | | |
|---|---|---|
| JP | 2002-026831 A | 1/2002 |
| JP | 2005-078553 A | 3/2005 |

(Continued)

OTHER PUBLICATIONS

Gell, Gordon H., I Want My MVT—Drive Marketing Results with Multivariable Testing Direction Marketing, vol. 60, No. 8, Dec. 1997.*

(Continued)

*Primary Examiner* — Scott L Jarrett
(74) *Attorney, Agent, or Firm* — Mannava & Kang, P.C.

(57) ABSTRACT

A system for experimentation includes an experiment engine which can define an experiment relating to various treatments for a set of content elements. The experiment engine conducts the experiment by delivering treatments to control groups over the network. The selection of the treatments to deliver is optimized to provide treatments having a greater likelihood of satisfying an objective of the experiment.

17 Claims, 15 Drawing Sheets

(56) References Cited

U.S. PATENT DOCUMENTS

| | | | |
|---|---|---|---|
| 7,912,843 B2* | 3/2011 | Murdock et al. | 707/749 |
| 7,937,486 B2* | 5/2011 | Ohsumi | 709/231 |
| 7,949,561 B2* | 5/2011 | Briggs | 705/14.41 |
| 7,949,563 B2* | 5/2011 | Collins | 705/14.43 |
| 7,975,000 B2* | 7/2011 | Dixon et al. | 709/203 |
| 8,090,703 B1* | 1/2012 | Agarwal et al. | 707/707 |
| 8,155,995 B1* | 4/2012 | McGlaughlin et al. | 705/7.36 |
| 8,171,156 B2* | 5/2012 | Audenaert et al. | 709/235 |
| 8,229,788 B2* | 7/2012 | Nyhan et al. | 705/14.41 |
| 8,417,569 B2* | 4/2013 | Gross | 705/14.41 |
| 8,571,930 B1* | 10/2013 | Galperin | 705/14.43 |
| 8,583,766 B2* | 11/2013 | Dixon et al. | 709/219 |
| 2002/0042738 A1* | 4/2002 | Srinivasan et al. | 705/14 |
| 2003/0041050 A1* | 2/2003 | Smith et al. | 707/1 |
| 2004/0167928 A1* | 8/2004 | Anderson et al. | 707/104.1 |
| 2005/0027587 A1* | 2/2005 | Latona et al. | 705/10 |
| 2006/0242706 A1* | 10/2006 | Ross | 726/23 |
| 2007/0094072 A1* | 4/2007 | Vidals et al. | 705/14 |
| 2007/0121846 A1* | 5/2007 | Altberg et al. | 379/114.13 |
| 2007/0192369 A1* | 8/2007 | Gross | 707/104.1 |
| 2007/0239530 A1* | 10/2007 | Datar et al. | 705/14 |
| 2007/0244754 A1* | 10/2007 | Payne et al. | 705/14 |
| 2008/0059395 A1* | 3/2008 | Flinn et al. | 706/46 |
| 2008/0092182 A1* | 4/2008 | Conant | 725/109 |
| 2008/0109305 A1* | 5/2008 | Hengel et al. | 705/14 |
| 2008/0114652 A1* | 5/2008 | Chang et al. | 705/14 |
| 2008/0288350 A1* | 11/2008 | Iris et al. | 705/14 |
| 2008/0300958 A1* | 12/2008 | Gluck | 705/10 |
| 2009/0070219 A1* | 3/2009 | D'Angelo et al. | 705/14 |
| 2009/0106070 A1* | 4/2009 | Konar | 705/8 |
| 2009/0106105 A1* | 4/2009 | Lewis et al. | 705/14 |
| 2009/0138351 A1* | 5/2009 | Shih et al. | 705/14 |
| 2009/0265227 A1* | 10/2009 | Langford et al. | 705/14 |
| 2010/0312840 A1* | 12/2010 | Chestnut et al. | 709/206 |

FOREIGN PATENT DOCUMENTS

| | | |
|---|---|---|
| JP | 2006-505079 A | 2/2006 |
| WO | WO01/14952 A2 | 3/2001 |
| WO | 2004/042525 A2 | 5/2004 |
| WO | 2007/079393 A2 | 7/2007 |

OTHER PUBLICATIONS

Waldman, Evelyn, Selection of Newspapers for Split-Run Tests Journal of Marketing, vol. 20, 1955.*

Wallach, Van, Test Marketing: Pretesting—A Necessary Evil or a Creative Tool? Advertising Age, vol. 57, No. 12, Feb. 13, 1986.*

Rapp, Stan et al., Rediscover Split-Run Test Advertising Age, vol. 57, No. 60, Dec. 1, 1986.*

Hartnett, Michael, Lowe's uses multi-variable testing to improve promotion programs Stores, vol. 80, No. 12, Dec. 1998.*

Bhat, Subodh et al., Measuring User's Web Activity to Evaluate and Enhance Advertising Effectiveness Journal of Advertising, vol. 31, No. 3, Fall 2002.*

Hand, Fred E. et al., Do-it-Yourself Advertising and Promotion Wiley Small Business, Second Edition, Apr. 1997, ISBN-10: 0471154431.*

Memetrics.com Web Pages—eXperiment Operating System Memetrics Holdings, Pty, Feb. 2003, Retrieved from Archive.org Jun. 22, 2011.*

Louivere, Jordan J. et al., A comparison of importance weights and willingness-to-pay measures derived from choice-based conjoint, constant sum scales and best-worst scaling, Journal of Business Research, vol. 61, 2008.*

Louivere, Jordan J., Conjoint Analysis MOdeling of Stated Preferences Journal of Transportation Economics and Policy, Jan. 1998.*

McFadden, Daniel, Econometric Models for Probablistic Choice Among Products The Journal of Business, vol. 53, No. 3, Jul. 1980.*

Memetrics Ranked #1 Multivariate Testing and Site Optimization Vendor by Jupiter Research Across Service Offering, Methodology and Partner Integration, Business Wire, Nov. 2, 2006.*

Louivere, Jordan J. et al., Design and Analysis of Simulated Consumer Hoice or Allocation Experiements: An Approach Based on Aggregate Data, Journal of Marketing Research, vol. 20, No. 4, Nov. 1983.*

Memetrics Unviels xOs Express, An Affordable Web Site Testing & Optimization Platform Business Wire, Apr. 26, 2006.*

Accenture to Acquire Maxamine and Memetrics, Expanding Digital Marketing Sciences Services Accenture, Jan. 23, 2008.*

Karuga, Gilber G. et al., AdPalette: an algorithm for customizing online advertisements on the fly Decision Support Systems, vol. 32, 2001.*

Pfleeger, S.H., "Experimental design and analysis in software engineering", Springer Netherlands, vol. 1, No. 1, Dec. 1995, Abstract.

Wittink, D. et al., "Commercial Use of Conjoint Analysis in Europe: Results and Critical Reflections", Sawtooth Software, Inc., 1992.

Japanese Patent Office, English translation of "Japanese Search Report on Japanese Patent Application No. 2009-242116", dated Dec. 3, 2013.

* cited by examiner

SYSTEM AND METHOD FOR DETERMINING SETS OF ONLINE ADVERTISEMENT TREATMENTS USING CONFIDENCES

BACKGROUND

Experimentation is useful for testing new or different ideas, and can lead to better products, methods and techniques. Experimentation may involve providing a number of alternate ideas or approaches to various test subjects and observing the results. For example, experiments can be set-up for testing various structures or arrangements for content: (e.g., data or information which can be presented to a person in some form or fashion). To maximize the benefit of experimentation, it is desirable to have a suitable population of test subjects. In general, the greater the number of alternate ideas, the greater the number of test subjects required in order to provide or obtain accurate test results for an experiment. As the number of test subjects needed for obtaining accurate results grows, and as the number of alternating ideas grows, administering the experiment becomes a difficult, time-consuming and expensive task. As a result, experimentation, which can yield significant incite regarding how to achieve desired objectives, such as maximizing product sales, can become unaffordable.

BRIEF DESCRIPTION OF DRAWINGS

The embodiments of the invention will be described in detail in the following description with reference to the following figures.

DETAILED DESCRIPTION OF THE EMBODIMENTS

Figure 1:
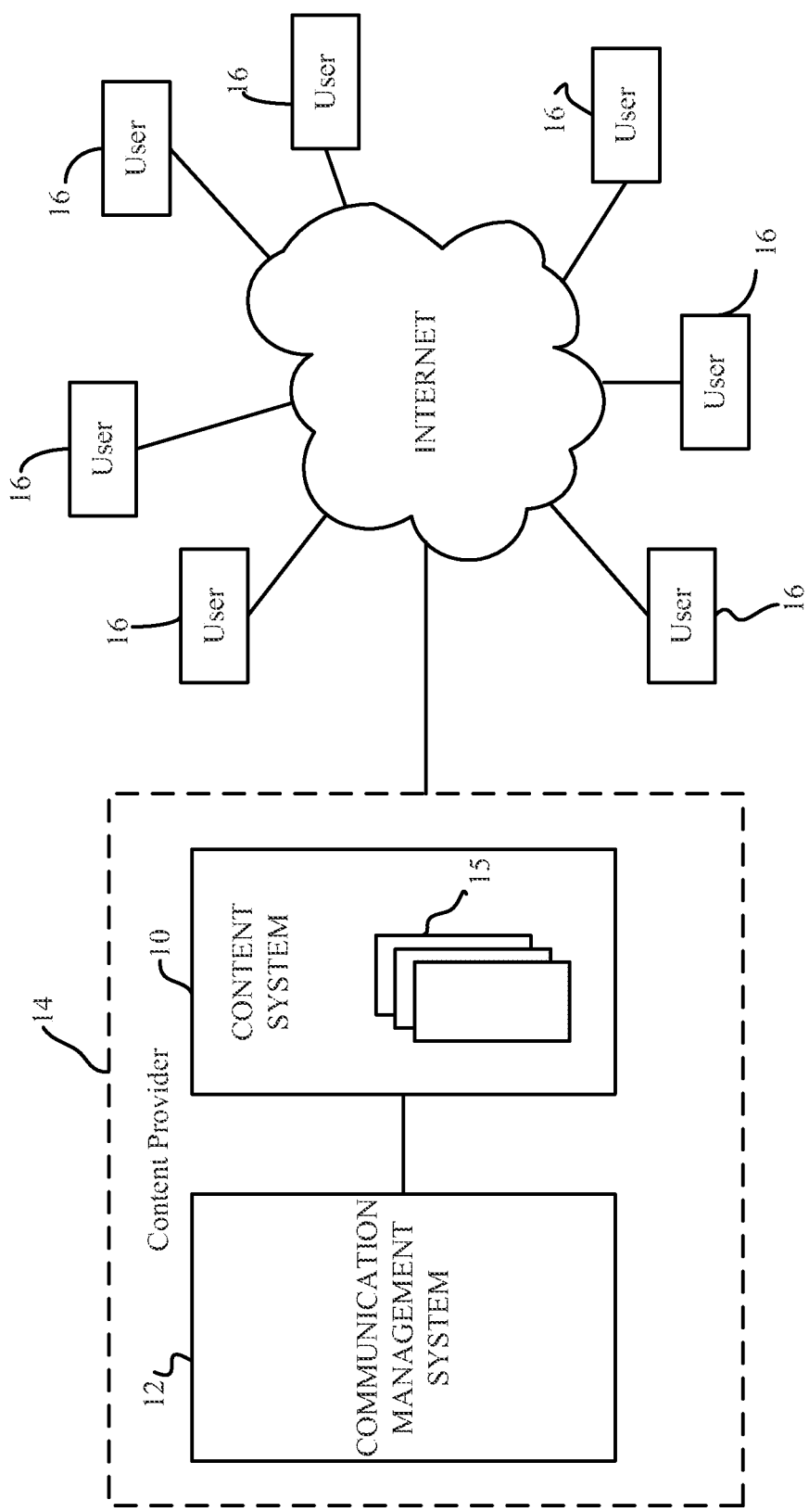
FIG. 1 illustrates an environment in which a content system and a communication management system may operate, according to an embodiment of the present invention.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Overview

According to an embodiment, a system for experimentation includes a communication management system and a content system which can define an experiment relating to various treatments for a set of content elements and administer the experiment over a data network. A treatment is a set of content elements. Examples of content elements, also referred to as elemental components, include a text file, an image file, an audio file, a video file, etc. These elemental components may be combined and/or formatted in a number of different ways or structures to create treatments to deliver to control groups for an experiment. Each separate combination and/or formatting of content elements can constitutes a treatment. In one example, a treatment can be a particular implementation of a web page at a given moment. More specifically, at the given instance of time, the web page treatment may contain particular text, icons, images, and/or video located at particular positions on the screen, particular visual background shading or color, particular borders for dividing up the screen, particular audio (music or speech), and the like.

The system for experimentation is configured to provide a systematic experimentation of treatments. The experiment is performed to determine the optimal form of the content elements to display in order to satisfy one or more objectives. In one example, the content elements are for an advertisement to be presented on web pages over the Internet, and the objective is to maximize the number of users that click on the advertisement for more information about the product or service being advertised. The system for experimentation creates treatments which represent different forms of the advertisement, each form having at least one different attribute or content element (e.g., banner ad, text ad, moving pop-up window, variations in colors, etc.). For the experiment, the system delivers the treatments to one or more control groups. The control groups are presented with the delivered treatments, and the control groups' behavior is captured. The captured behavior may include the control groups' interactions with the delivered treatments. Optimal treatments are identified, for example, based on the behavior of the control groups. The optimal treatments are treatments estimated to have the greatest ability to achieve a desired objective.

According to an embodiment, during the experiment, the testing of treatments is optimized to minimize the proportion of treatments delivered that are determined to be sub-optimal. A sub-optimal treatment is estimated to have a low ability to achieve a desired objective relative to other treatments. The system allows the frequency with which treatments delivered to the control groups to vary according to a prediction model. The treatments that are delivered are varied according to confidences determined using the model. A weighting factor is applied based on the determined confidences of delivered treatments, and the weighting factor is used to select new treatments to deliver and to determine the new proportion by which treatments will be delivered to the control groups.

This optimizing of treatments ultimately can reduce the time it takes to identify a combination of content elements that is determined to be most optimal based on one or more objectives, while additionally minimizing the delivery of suboptimal content throughout the experimental process, thereby reducing the time of experimentation. This reduction in time can translate into significant cost savings and reduced time-to-market for delivering the content in the production environment.

U.S. Pat. No. 6,934,748, entitled, "Automated On-Line Experimentation to Measure Users Behavior to Treatment for a Set of Content Elements", which is assigned to the assignee of the present application, is incorporated by reference in its entirety. The system and methods of experimentation according to the embodiments of the invention described herein may be used in the system described in U.S. Pat. No. 6,934,748.

Environment for Content Management

FIG. 1 illustrates an environment in which a content system 10 and a communication management system 12, according to an embodiment of the present: invention, may operate. In general, content system 10 and communication management system 12 cooperate to manage the delivery of content 15 to one or more users 16, as described in more detail herein. Content system 10 and communication management system 12 may each comprise a suitable combination of software and/or hardware for performing the functionality described herein.

It is contemplated that systems 10 and 12 may be maintained, managed, and/or operated by a provider 14 of content 15 to users 16. Such content provider 14 can be an entity which operates or maintains a portal or any other website through which content can be delivered. For example, content provider 14 can be on-line retailer of merchandise, an on-line news service, and the like. Each user 16 may "visit" the website operated by content: provider 14, for example, to view information, and perhaps, to complete a commercial transaction. Users 16 can include individuals, organizations, or their agents, which can be human or virtual.

Content system 10 serves as a repository for content 15. Content system 10 can be implemented at least in part with any system suitable for storing content. For example, content system 10 may include a SPECTRA server system from Allaire Corporation or a STORY server system from Vignette Corporation. In general, content 15 can be any data or information that is presentable (visually, audibly, or otherwise) to users 16. Thus, content 15 can include written text, images, graphics, animation, video, music, voice, and the like, or any combination thereof. For example, if content provider 14 is a on-line retailer of merchandise, content 15 may include images of various goods offered by the retailer, textual descriptions and price quotes for each good, detailed information about on-line ordering, graphics or animation to capture a user's attention, etc. Similarly, if content provider 14 is a web portal, content 15 may include textual listings or directories for various areas of interest, icons (interactive or non-interactive), images of products, hyperlinks to other websites, banner advertisements, etc. If content provider 14 is an on-line news service, content 15 may include textual information for various news stories, photographs and/or illustrations to accompany at least some of the stories, video and/or audio clips for late-breaking stories, listings for weather reports in various geographic areas, maps for these geographic areas, etc. Content 15 from content system 10 may be provided for any of a variety of purposes or applications, such as, for example, product development, public relations, customer service, advertising, electronic commerce, and the like.

Content 15, which can be stored in digital form, may be broken down or reduced to a set of elemental components. An elemental component can be, for example, a text file, an image file, an audio file, a video file, etc. These elemental components may be combined and/or formatted in a number of different ways or structures for presenting content 15 to users 16.

Each separate combination and/or formatting of content 15 constitutes a content structure or treatment. A content structure can be, for example, a particular implementation of a web page at a given moment. More specifically, at the given instance of time, the web page may contain particular text, icons, images, and/or video located at particular positions on the screen, particular visual background shading or color, particular borders for dividing up the screen, particular audio (music or speech), and the like.

The way content 15 is structured may affect or impact a user's behavior or reaction to the content. For example, a user 16 may react positively to a web page having a neutral background color (e.g., gray), and negatively to a web page having a bolder background color (e.g., fuchsia). A user's reaction may be tied to a particular desired objective or outcome. An outcome generally can relate to any behavior by a user at a website that content provider 14 would like to influence or manage. This behavior can include "click-throughs" of the website by a user, time spent by the user on requests for information, number and nature of pages viewed by the user, length of time spent at the website by the user, repeat sessions, purchases of goods/services offered on the websites, submission of information, registration, login, personalization, reading, or other related behaviors. For example, for an on-line retailer of merchandise, one desired objective/outcome can be the completion of a transaction or sale. For a web portal, a desired objective/outcome can be increased "stickiness" (i.e., the amount of time that a user 16 spends at the website, and the number of repeat visits to the website). As such, structured content may be meaningful in the context of its relationship to a desired objective/outcome.

Because various objectives/outcomes may be important to content provider 14, communication management system 12 is provided to manage the content 15 (and structures for same) which is ultimately delivered or presented to users 16, thereby influencing the behavior of users 16 in such a way as to achieve the desired objectives/outcomes. Communication management system 12 supplements the functionality of the existing content system 10 as described herein. In one embodiment, communication management system 12 can be implemented as a software-based or software-driven product which can be bundled or integrated with an existing content system of content provider 14. Communication management system 12 enhances any application of structured content by identifying the linkage or connection between content 15 and desired objectives, and providing feedback in relation to what structured content should be delivered to users 16 in the future.

To accomplish this, communication management system 12 may cooperate with content system 10 to break down any given content 15 to its elemental components, create one or more content structures or treatments for presenting the content to users, design experiments to test the behavior or reaction of users to each treatment, deliver the treatments over a suitable data network to one or more users in controlled experiments, collect information or data on the outcomes/objectives for each experiment, generate predictive models using the collected information, and modify or customize the structure of content 15 using the predictive models.

To optimize the effectiveness of the structured content, content provider 14 determines its objectives for the associated portal or website in relation to the behavior of users 16 and decides what elements of the communication are relevant or have potential to influence that behavior. For example, content provider 14 may want to optimize its communication to achieve better match between relevant content 15 and user preferences in order to increase return visits of users 16 in general to the portal or website. Content 20 system 10 and communication management system 12 facilitate the identification and specification of the relevant elemental components, the specification of various alternative structures for content (e.g., messages and means of communication), and assign control variables and values to 25 these structures for implementation. As such, content system 10 and communication management system 12 may implement a systematic approach for the design and development of interactive communication to optimize, enhance, or otherwise improve, for example, product development, public relations, customer service, advertising effectiveness, electronic commerce, or any other application which can benefit from real-time customization of content 15. Content system 10 and communication management system 12 may thus collectively implement a system for managing the delivery of content 15 to users 16.

Content system 10 and communication management system 12 may be integrated with or connected to a suitable data network or digital system-i.e., a system augmented by digital services. As used herein, the terms "connected," 40 "coupled," or any variant thereof, means any connection or coupling, either direct or indirect, between two or more elements; such connection or coupling can be physical or logical. In general, a data network or digital system can provide or support an interactive channel by which users 16 may interact with content system 10 and communication management system 12. Examples of such data networks or digital systems include, telephone call centers, cellular networks, pager networks, automated teller machine (ATM) networks, instant messaging systems, local area networks so (LANs), wide area networks MAW, Intranets, Extranets, interactive television services or, as depicted, Internet 18.

Internet 18 is an interconnection of computer "clients" and "servers" located throughout the world and exchanging information according to Transmission Control Protocol/Internet Protocol (TCP/IP), Internetwork Packet eXchange/Sequence Packet eXchange (IPX/SPX), AppleTalk, or other suitable protocol. Internet 18 supports the distributed application known as the "World Wide Web." Web servers maintain websites, each comprising one or more web pages at which information is made available for viewing. Each website or web page can be identified by a respective uniform resource locator (URL) and may be supported by documents formatted in any suitable language, such as, for example, hypertext markup language (HTML), extended markup language (XML), or standard generalized markup language (SGML). Clients may locally execute a "web browser" program. A web browser is a computer program that allows the exchange of information with the World Wide Web. Any of a variety of web browsers are available, such as NETSCAPE NAVIGATOR from Netscape Communications Corp., INTERNET EXPLORER from Microsoft Corporation, and others that allow convenient access and s navigation of the Internet 18. Information may be communicated from a web server to a client using a suitable protocol, such as, for example, Hyper-Text Transfer Protocol (HTTP) or File Transfer Protocol (FTP). Internet 18 allows interactive communication between users 16 and the content and communication management systems 10 and 12.

In one embodiment, content system 10 and communication management system 12 enable content provider 14 to automatically customized content 15 delivered to users 16 via a data network such as the Internet 18. Due to the widespread popularity of the Internet 18, content system 10 and communication management system 12 have the capability to reach a relatively large number of users 16, thereby allowing significant segmentation of users and experimentation in a large pool. The remainder of this description focuses primarily on a system and method in the context of the Internet 18, but it should be understood that the present invention is broadly applicable to any data network which is capable of reaching or connecting a relatively large number of users 16 to provide a wide cross-section of users. Such data network can be, for example, WebTV, InteractiveTV, WAP+ mobile services, or any other interactive channel.

Content system 10 and communication management system 12 can provide a completely automated solution by dynamically segmenting users 16, automatically generating personalization rules, and delivering web pages, offers for products/services, or other interactive communication to achieve desired objectives. In other words, content system 10 and communication management system 12 can determine what matters to users 16 and then use this information to optimize interactive communications to achieve specific outcomes/objectives, such as, for example, increasing sales and profits, improving electronic marketing effectiveness, and powering specific business intelligence applications.

Content System and Communication Management System

Figure 2:
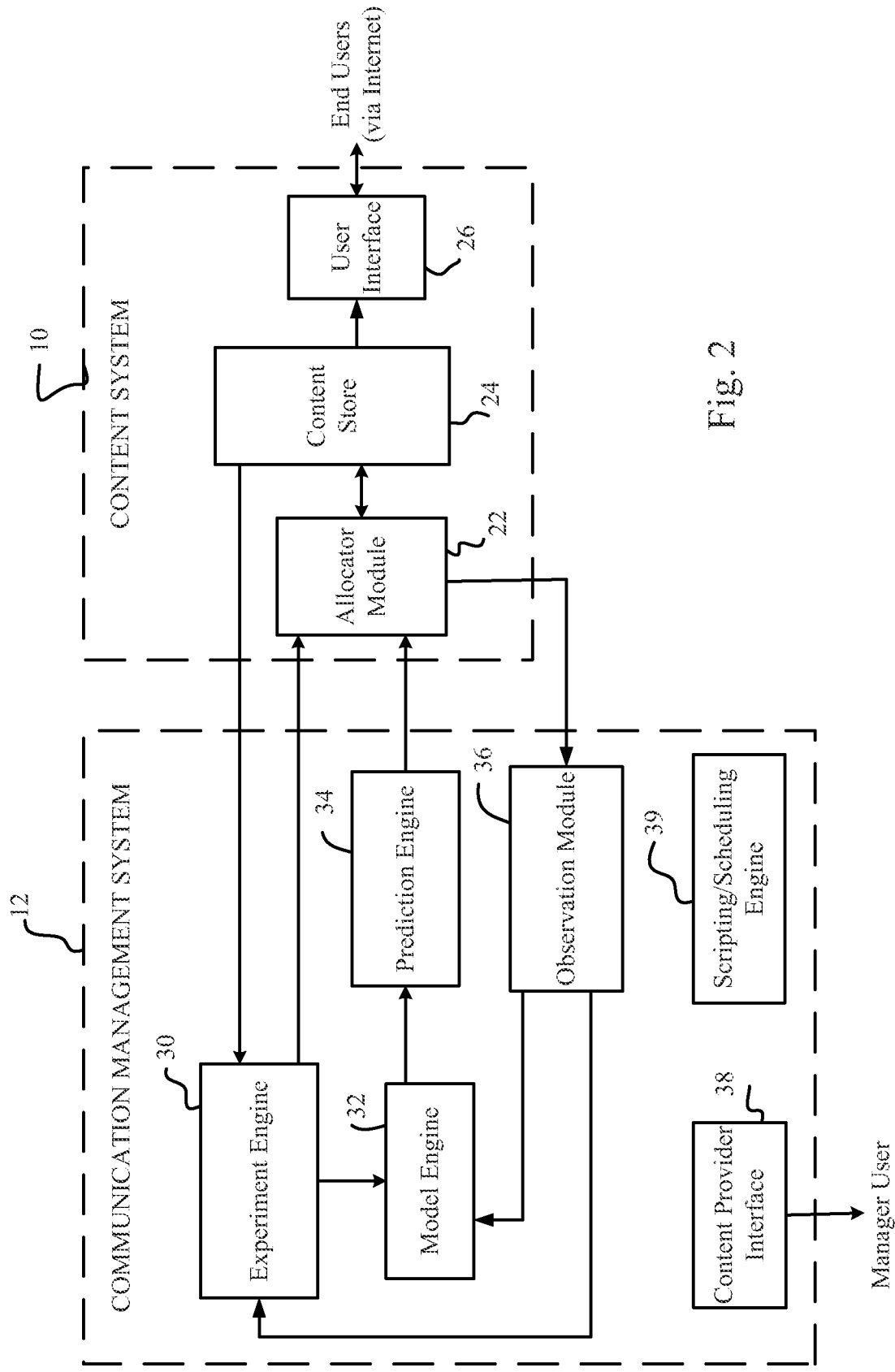
FIG. 2 is a block diagram for a content system and a communication management system, according to an embodiment of the present invention.

FIG. 2 is a block diagram for content system 10 and communication management system 12, according to an embodiment of the present invention. Content system 10 and communication management system 12 cooperate to enhance any application of structured content. As depicted, content system 10 includes an allocator module 22, a content store 24, and a user interface 26. Communication management system 12 includes an experiment engine 30, a model engine 32, a prediction engine 34, an observation module 36, a content provider interface 38, and a scripting/scheduling engine 39.

In content system 10, content store 24 functions to store content 15 which may be delivered and presented to various users 16 via, for example, the Internet 18. This content 15 may include, for example, images and/or descriptions of various goods or services which are being offered for sale, price quotes for each good or service, detailed information about on-line ordering, listings for various areas of interest, links to one or more websites, banner advertisements, etc. All or a portion of this content 15 can be maintained in digital form. Content store 24 may be implemented in any one or more suitable storage media, such as random access memory (RAM), disk storage, or other suitable volatile and/or non-volatile storage medium. In one embodiment, content store 24 may comprise a relational database.

User interface 26 is connected to content store 24. User interface 26 generally functions to provide or support an interface between content system 10 and one or more users 16, each using a suitable client computer connected to Internet 18. User interface 26 may receive requests for content 15 from the users 16. An exemplary request can be a request for a web page displaying a particular line of products, and may specify a particular identifier for the web page, such as, for example, a uniform resource locator (URL). Furthermore, the web page request can be related to a user's action of "clicking" on a particular hyperlink on a web page. In response to such requests, user interface 26 delivers or presents content 15. The interconnectivity of components of user interface 26 may be supported with is suitable communication hubs, routers, or otherwise, as may be used in the underlying architecture of the data network (e.g., Internet 18) responsible for delivery of content.

Allocator module 22, which, is connected to content store 24, may comprise one or more programs which, when executed, perform the functionality described herein. Allocator module 22 generally functions to allocate (i.e., cause to be delivered) content 15 to various users 16. Allocation can be done, for example, based on the following: information available about users 16; and commands from other elements or modules within content system 10 or communication management system 12, which may place any given user 16 in an experiment or deliver content according to predictions and models.

As such, allocator module 22 may be responsive to requests for content 15 from users 16. For each request, allocator module 22 may allocate a content structure or treatment for purposes of experimentation or based on a prediction of what will achieve a desired outcome/objective. To accomplish this, allocator module 22 may apply situation specific rules, such as experiment rules and prediction rules (described herein). Also, allocator module 22 may sample all traffic, at the website or portal in order, for example, to determine which users 16 will be assigned to receive controlled communication (i.e., specific content). Thus, allocator module 22 provides guidance to content system 19 on what content 15 to display on a user-by-user basis. Allocator module 22 is coupled to observation module 36 in communication management system 12 and may store observation data therein on behalf of the content system 10.

Allocator module 22 also supports or provides an interface between communication management system 12 and content system 10. As such, allocator module 22 may include a suitable application programming interface (API) which can interact and integrate with Web server software (e.g., available from NETSCAPE, APACHE, or JAVA SERVLET) and management application software (e.g., VIGNETTE, SPECTRA, or BROAD VISION).

The functionality of allocator module 22 can be performed by any suitable processor such as a main-frame, file server, workstation, or other suitable data processing facility running appropriate software and operating under the control of any suitable operating system, such as MS-DOS, MacINTOSH OS, WINDOWS NT, WINDOWS 2000, OS/2, UNIX, XENIX, GEOS, and the like.

Communication management system 12 is in communication with content system 10. Referring to communication management system 12, experiment engine 30 is coupled to content store 24 and allocator module 22 (both in content system 10). Experiment engine 30 may receive definitions for various experiments and content 15. Experiment engine 30 may comprise one or more programs which, when executed, perform the functionality described herein. Experiment engine 30 generally functions to support the creation and execution of one or more experiments to test the behavior or reaction of users 16 to particular content 15 and/or the particular way in which the content is formatted (i.e., treatments). For each experiment, experiment engine 30 may generate a set of rules which dictate how treatments are allocated during the course of the experiment. The experiments created and executed by experiment engine 30 may include, for example, full factorial experiments and designed fractions of full factorial experiments (also referred to as simply "designed experiments").

In a full factorial experiment for a given set of content elements, every possible combination of content elements is considered. Each content element may constitute a factor to be considered and analyzed. A full factorial experiment allows estimation of the effect of each factor in isolation. That is, the results from a full factorial experiment include all information about the main effect that each content element has on the observed outcome independent of every other content element. A full factorial experiment also estimates the effect of each and every interaction between all possible combinations of factors.

For example, consider a case in which there are two types of content elements: a banner advertisement and a text message which can be displayed below the banner advertisement. Each content element may have two variations. For banner advertisement, the variations can be static and moving. For messages, the variations can be "click here now" and "save 20%." Thus, there are four possible combinations that can be viewed: (1) static banner advertisement with a "click" message, (2) static banner advertisement with a "save" message, (3) moving banner advertisement with a "click" message, and (4) moving banner advertisement with a "save" message. The main effects for each element (i.e., static, moving, "click," and "save") as well as the interaction effects for all possible combinations of the same, can be observed. Thus, the entire space of all possible effects can be estimated. Because a full factorial experiment considers all possible alternatives for content structure, it supports a very thorough analysis of observed outcomes.

As the number of variables in an experiment are increased linearly, however, the number of combinations of content elements increases exponentially. That is, when another content element or variation is added to a given experiment, the number of combinations for the experiment can increase significantly. For example, for four content elements, each having three variations, eighty-one combinations are possible. For five content elements, each having four variations, the number of possible combinations is 1024. In view of this, a full factorial experiment can produce more combinations than reasonable for purposes of experimentation—i.e., the time required to satisfy the sampling requirements may be unacceptably long, given the rate of "hits" to a website.

Designed experiments reduce the number of combinations required for experimentation (relative to full factorial experiments), while still allowing measurement and estimation of the effects that are of interest. Designed experiments typically focus on a relatively small group of effects of particular interest; while controlling for all other effects. Designed experiments use an experimental design to control specific events and the conditions under which those events occur, thus allowing the effect of such events in relation to some observed outcome to be explicitly measured and estimated. In other words, a designed experiment is a systematic way to vary one or more variables which can be controlled (e.g., background color of an advertisement screen placement of advertisement, size of advertisement) and investigate the effects such variances have on one or more outcomes of interest. Designed experiments may consider only the main effects of the variables. Accordingly, designed experiments reduce the information involved in an experiment (e.g., the number of combinations), thus offering a potentially vast reduction in sampling requirements (e.g., the minimum number of users 16 required to participate in the experiment).

For example, for five elements, each having four variations, if it is assumed that there are no important interaction effects, experiment engine 30 may create a designed experiment that will allow measurement and estimation of all the main effects (i.e., those that do not involve interactions) with only sixteen combinations, rather than the 1024 combinations required for a full factorial experiment.

Experiment engine 30 may generate designed experiments in a number of ways. For example, experiment engine 30 may include or incorporate various look-up tables, such as, for example, tables published by the U.S. National Bureau of Standards. In addition to tables, designed experiments can be generated using algorithms which, when run, will create the appropriate tables meeting the criteria for which the algorithm is designed. These tables and algorithms can be used to identify appropriate constraints upon behavioral models (described herein). Furthermore, designed experiments can be created by random selection for variable values, or via programmed search algorithms through the full factorial space.

Designed experiments may be described using a number of important criteria. For example, designs may be described by the specific effects they allow; the number of factors and factor levels included and whether or not there are the same number of levels in each factor; and the amount of information produced in relation to the objective outcome. Experiment engine 30 may employ any or all of these methods to find or produce the best designs to use for a particular application.

Designed experiments allow communication management system 12 to make inferences about some of the variables that drive the choices of users 16. These designed experiments may implement or support an understanding of random utility theory (RUT). Random utility theory postulates that the true value to a user of some item (e.g., a banner advertisement or a web page) cannot be observed because it is a mental quality in the user's mind. That is, the thought process by which a user arrives at a particular decision cannot always be captured or observed. In view of this, designed experiments allow communication management system 12 to make inferences about some of the variables that drive user choices based upon what users actually do, not what they think or express.

In one embodiment, experiment engine 30 provides functionality for the following: a) full factorial experiments which consider all possible combinations, b) designed experiments which consider the minimum possible combinations ("main effects only"), and c) designed experiments that estimate all two-variable interactions or selected two-variable interactions.

Model engine 32 is in communication with experiment engine 30 and may obtain the definition of various experiments therefrom. Model engine 32 may comprise one or more programs which, when executed, perform the functionality described herein. The data produced from each experiment specifies outcomes relevant to the objectives set by content provider 14. Once the experiments are completed, this data may transferred to model engine 32 to identify the degree to which the content elements influence the behavior of users 16. That is, model engine 32 uses the results or data collected during the various experiments to create one or more behavioral models of human decisions and choices.

In general, a model attempts to predict what users 16 may do in the future based on observations made of past behavior from users with similar characteristics. A behavioral model may comprise a sophisticated, continuous, and discrete multivariate statistical model which can be used to determine what aspects of a content structure or treatment influence the probability of achieving a particular outcome. All actions that users 16 take in an interactive environment potentially can be observed and modeled using forms of choice models based on random utility theory. That is, the observed behavioral characteristics of users 16 maybe embedded in choice models resulting from designed experiments. The models can model the behavior of users 16 in terms of how the users respond to different stimuli (e.g., treatments). Model engine 32 performs this analysis and suggests which treatments to present to users 16 in the future in order to meet the desired objectives.

A behavioral model can be, for example, a statistical abstraction of an unknown decision-making process used by a user to make particular decision, such as, for example, whether to click on a particular banner advertisement, whether to purchase a particular product being offered, etc. Thus, although a user's decision-making process cannot be observed, behavioral modeling attempts to approximate these processes statistically using random utility theory 3Q developed and refined by econometricians and psychometricians. The unexplained component of a user's choice may be considered to be the deviation of that user from what a behavioral model predicts. This is "stochastic" is the sense that there is an element of user behavior that cannot be explained.

The models generated by model engine 32 may thus model and predict the probability that a randomly selected user 16 from some sample or segment will perform a particular action or combination of actions when faced with a number of possible actions. As such, the behavioral models may consider user choices. These choice models do not predict the exact choice that will be made by a user, but rather the probability that a any given user will choose a particular action. In particular, choice models describe how the probability of users' choices or decisions (i.e., their behavior) will vary according to one or more elements that were manipulated in a respective experiment or according to users' profiles. Choice models thus consider variables that describe the options for choices (e.g., prices, discount levels, colors of products offered at a website) and the variables that describe users 16 (e.g., time of day, day of week, Internet service provider (ISP), operating system for an application). Inclusion of variables that describe users 16 allow choice models to be used to optimize content, offers, etc. for particular user profiles. For example, once model generator 32 has generated a model that predicts how choice probabilities of users 16 vary with background color and page placement, as well as time of day, day of week and ISP, then prediction engine 34 and model engine 32 can predict which color and placement location should be provided or displayed to any given user to optimize an objective (e.g., to maximize click rates) Thus, the model may be used to determine what set of content 15 is most suitable for achieving a desired outcome.

In one example for a choice model, the unexplained component of user' decision making processes is distributed according to a Gumbel distribution. The deviations of each choice from that distribution sum to zero, and each deviation is independent and has the same variance. This produces a model known as a multinomial logit (MNL) model. For a situation with multiple choices, the MNL model can be expressed as follows:

$$\frac{P(i \mid C) \times \exp(V_i)}{\sum_j \exp(V_j)}, \text{ for all } j \text{ offered in } C.$$

In the above equation, $V_i$ and $V_j$ are the values of the ith and jth choice options (actions, choices), exp is the exponential operator (i.e., eV), and C is the set of possible actions or choices. In application of the MNL model, the V's are estimated as linear-in-the-parameters functions of the variables of interest. That is, the V's are expressed as multiple-regression-like functions of some predictor variables (e.g.,color of an advertisement, placement of an advertisement, time of day for observed behavior, user's ISP, the interaction of advertisement color and ISP, etc.). Parameters are estimated for each variable from the data obtained as the outcome of experimentation. The parameters then are used in the MNL model to predict the probability that a particular user profile will choose a particular choice option (action). Alternatively, the results of the model are used to determine what particular combination of variables (i.e., treatment) to show to a user with a particular profile, such as, for example, which combination of advertisement color and placement should be displayed to a user with AOL as an ISP and who interacts with the website between 2:00 a.m. and 3:00 a.m. on a Tuesday.

Model engine 32 may implement techniques for choice modeling, Bayesian modeling, or other useful modeling for the choices of users 16 (e.g., visitors to a website) as revealed, for example, in their click patterns, responses to questions, session times, purchases, registrations, return visits, option selections, etc. In one embodiment, the modeling may implement techniques of Bayesian Markov Chain Monte Carlo estimation procedures. Model engine 32 may use a structure, referred to as a "model instruction," which allows the model engine 32 to extract that part of the experiment data required for modeling from observation module 36.

Prediction engine 34 is in communication with model engine 32 and allocator module 22. Prediction engine 34 may comprise one or more programs which, when executed, perform the functionality described herein. From the experimentation and modeling, prediction engine 34 functions to generate or create one or more predictions. A prediction can be a simple description of a model which is used to deliver content 15 to users 16 in a way which is most effective to achieve one or more desired outcomes/objectives. For example, a prediction may predict that a user 16 with certain characteristics will, for a particular website, click through to key web pages, buy merchandise at the website, visit between the hours of 9:00 p.m. and midnight, or any other strategic objective of interest.

In one implementation, prediction engine 34 may identify from a model that set of content elements which is predicted to be most likely to cause any given user who visits the website to behave consistently with the model's objective (i.e., consistent with a particular goal or objective of the content provider 14). In another implementation prediction engine 34 may allow content provider 14 to make such an identification.

Prediction engine 34 may generate predictive covariates, 65 which can be used when allocating content 15 to users 16 in response to requests for the same. That is, prediction engine 34 may generate prediction rules for targeting specific content to certain kinds of users 16, thus providing personalization in the delivery of content 15. The prediction rules can be a set of rules which match different types or classes of users 16 to specific content 15. Accordingly, prediction engine 34 converts a model (which provides an abstract 5 description of observed behavior) into a simple set of rules that attempts to optimize desired behavior. The prediction rules are forwarded to allocator module 22 for application in the delivery of content 15 to users 16.

The functionality of each of experiment engine 30, model engine 32, and prediction engine 34 can be performed by any suitable processor such as a main-frame, file server, workstation, or other suitable data processing facility running appropriate software and operating under the control of any suitable operating system, such as MS-DOS, MacINTOSH OS, WINDOWS NT, WINDOWS 2000, OS/2, UNIX, XENIX, GEOS, and the like.

Observation module 36 communicates with allocator module 22 (in content system 10), experiment engine 30, and model engine 32. Observation module 36 generally functions to maintain or store observation data. Observation data can be information or data relating to the observed behavior of users 16 which visit the website of content provider 14. The observation data can be collected for each experiment conducted by communication management system 12, and thus, can include information for the experimental conditions and the observed outcomes. Furthermore, observation data stored in observation module 36 can include data for a number of variables, such as experiment variables, covariates, and dependent variables. Experiment variables may relate to or represent content itself. For example, experiment variables may relate to or specify the content treatments for an experiment and a time period for experimentation. Experiment variables can be controlled and may be considered independent variables. Dependent variables relate to or represent outcomes. For example, dependent variables may relate to the observed behavior of users, prior or subsequent to a treatment allocation. Dependent variables will typically be components of the goal function which is to he optimized. As an illustrative example, dependent variables may relate to the allocation of treatments and the successes or failures for such allocation. An instance of a treatment allocation is deemed to be a "success" if a user 16 reacts in a desired manner to the treatment; an instance of a treatment allocation is deemed to be a "failure" if a user 16 does not react in a desired manner to the treatment. Covariates are variables which relate to or represent users 16. For example, covariates may relate to characteristics of an end user (e.g., particular computer and web browser). Further, covariates may relate to characteristics of usage (e.g., buttons clicked, navigation options selected, information submitted, purchases made, etc.). Observation data may also include information available from the data log or customer database of a website. With this data and information, communication management system 12 may segment users 16 into discrete groups or specify a distribution of users 16, wherein each grouping or distribution is characterized by a particular set of behavioral outcomes.

Observation module 36 may be implemented in any one or more suitable storage media, such as random access memory (RAIVI) disk storage, or other suitable volatile and/or non-volatile storage medium. In one embodiment, observation module 36 may comprise a relational database.

Content provider interface 38 can be in communication with content store 24 (in content system 10), experiment engine 30, and observation module 36. Content provider interface 38 receives model results and initiates analysis, evaluation, selection, calibration, and basic reports. Content provider interface 38 generally supports an interface between communication management: system 12 and a human user at content provider 14, such as an information services manager. Content provider interface 38 allows the manager user to ask questions, record and test scenarios, and generate or obtain reports to quantify results.

For example, content provider interface 38 allows a 10 manager user to assist in the set up and management of the processes for experimentation, modeling, and prediction performed by communication management system 12. Content provider interface 38 may receive new content 15 for input into content store 24, and definitions for forwarding to experiment engine 30. In one embodiment, content provider interface 38 can be used to define the conditions and space for various experiments, the attributes and levels that will be manipulated, individual data tracked, and to initiate the generation or creation of various experimental designs. Furthermore, content provider interface 38 may allow the manager user to view and analyze data, both in raw form straight from the observation module 36, and also in model form from model engine 32.

The functionality of content provider interface 38 can be performed by one or more suitable input devices, such as a key pad, touch screen, input port, pointing device (e.g., mouse), microphone, and/or other device that can accept information, and one or more suitable output devices, such as a computer display, output port, speaker, or other device, for conveying information, including digital data, visual information, or audio information. In one embodiment, content provider interface 38 may comprise or be operable to display at least one graphical user interface (GUI) having a number of interactive devices, such as buttons, windows, pull-down menus, and the like to facilitate the entry, viewing, and/or retrieval of information.

Scripting/scheduling engine 39 may be in communication with allocator module 22, experiment engine 30, model engine 32, prediction engine 34, and content provider interface 38. Scripting/scheduling engine 39 may comprise one or more programs which, when executed, perform the functionality described herein. Scripting/scheduling engine 39 generally functions to manage the overall operation of communication management system 12 and content system 10.

Scripting/scheduling engine 39 provides or supports the generation of scripts which coordinate the behavior, activity, and/or interaction of allocator module 22, experiment engine 30, model engine 32, predictor engine 34, and observation module 36. Accordingly, scripting/scheduling engine 39 may automate the entire process of experimentation, modeling, and prediction described herein. Essentially, each script may direct one or more elements in content system 10 or communication system 12 to perform a particular action or set of actions.

For example, scripting/scheduling engine 39 supports the set up of the various experiments which may be conducted to gauge the behavior or reaction of users 16. For each experiment, scripting/scheduling engine 39 may generate or supply definitions. These definitions can be supplied to allocator module 22 for performing experiments. In addition, scripting/scheduling engine 39 may monitor for the completion of an experiment, and subsequently, direct model engine 32 to build or generate a model from the experimental data. Scripting/scheduling engine 39 may generate or supply scripting for converting the results of such experiments into models and, ultimately, predictions, which are designed to achieve specific outcomes/objectives. Scripting/scheduling engine 39 may deliver instructions to model engine 32 on how to build a model. These instructions may specify data locations within observation module 36 and names for each of a number of variables (e.g., experiment variables, covariates, and dependent variables), translations in encoding for easier modeling, conversions of data from continuous to discrete and model form, and any other parameters. Scripting/scheduling engine 39 may create a time-related interpretation for the state of the model for use by allocator module 22 in dealing with user requests for content 15. Furthermore, scripting/scheduling engine 39 may provide instructions or commands to allocator module 22 for delivering content 15, either for experimentation or pursuant to models/predictions. Each script may include basic error handling procedures.

The functionality of scripting/scheduling engine 39 can be performed by any suitable processor, which can be the same or separate from the processor(s) for experiment engine 30, model engine 32, and prediction engine 34.

In operation, generally speaking, content provider interface 38 may receive experimental definitions from a content provider 14. In one embodiment, for example, a manager user at content provider 14 inputs data relating to past website traffic or samples; from current website traffic in order to determine how to set up and schedule an experiment. Using the experimental definitions, experiment engine 30 designs one or more experiments for a particular set of content. Each experiment: may involve a plurality of content structures or treatments for the content. One of the treatments serves as a control treatment, while the remaining treatments serve as experimental treatments. For each experiment, experiment engine 30 may generate a separate set of experiment rules which dictate how the treatments are delivered during experimentation. These experiment rules are forwarded to allocator module 22.

Allocator module 22 allocates the different treatments to various users 16 in response to requests for content from the same. This allocation is done in accordance with the rules for experiments designed by experiment engine 30. During experimentation, communication management system 12 observes the behavior of the users to each treatment and collects or stores data on these observations in observation module 36. This includes data for experiment variables, covariates, and independent variables.

Using the observation data, model engine 32 generates one or more models for each experiment conducted. These models may capture the relationship between the incidence of the objective behaviors by users 16 and a set of controlled content variables and details about the users visits.

From the experimentation and modeling, communication management system 12 may modify or customize the treatments of content 15 which are delivered to users 16. In particular, prediction engine 34 generates one or more predictions, which are used to deliver content 15 to users 16 in a way which is most effective to achieve one or more 55 desired outcomes/objectives. In one embodiment, prediction engine 34 automatically searches the results of experimentation and modeling for the optimal content structure or treatment and recommends that for delivery to users 16. In an alternative embodiment, prediction engine 34 allows a human user (e.g., information systems manager) at content provider 14 to specify a plurality of optimal content structures or treatments for delivery to users 16. Prediction engine 34 generates a set of prediction rules which can be forwarded to allocator module 22 in content system 10.

Each of the processes of experimenting, modeling, and predicting may be repeated. By continuously experimenting with content 15 that will be delivered to users 16, content system 10 and communication management system 12 systematically isolate the effects of different attributes of the communication on desired outcomes/objectives. By modeling segments or individual users 16 based on this continuous experimentation (as described herein), content system 10 and communication management system 12 can automatically and accurately generate and define rules for presenting custom communication to achieve or increase the desired 10 outcomes/objectives.

As such, content system 10 and communication management system 12 implement a systematic approach for the design and development of interactive communication to optimize, enhance, or otherwise improve product development, public relations, customer service, advertising effectiveness, electronic commerce, or any other application which can benefit from real time mass customization of content 15.

Experiment Engine

Figure 3:
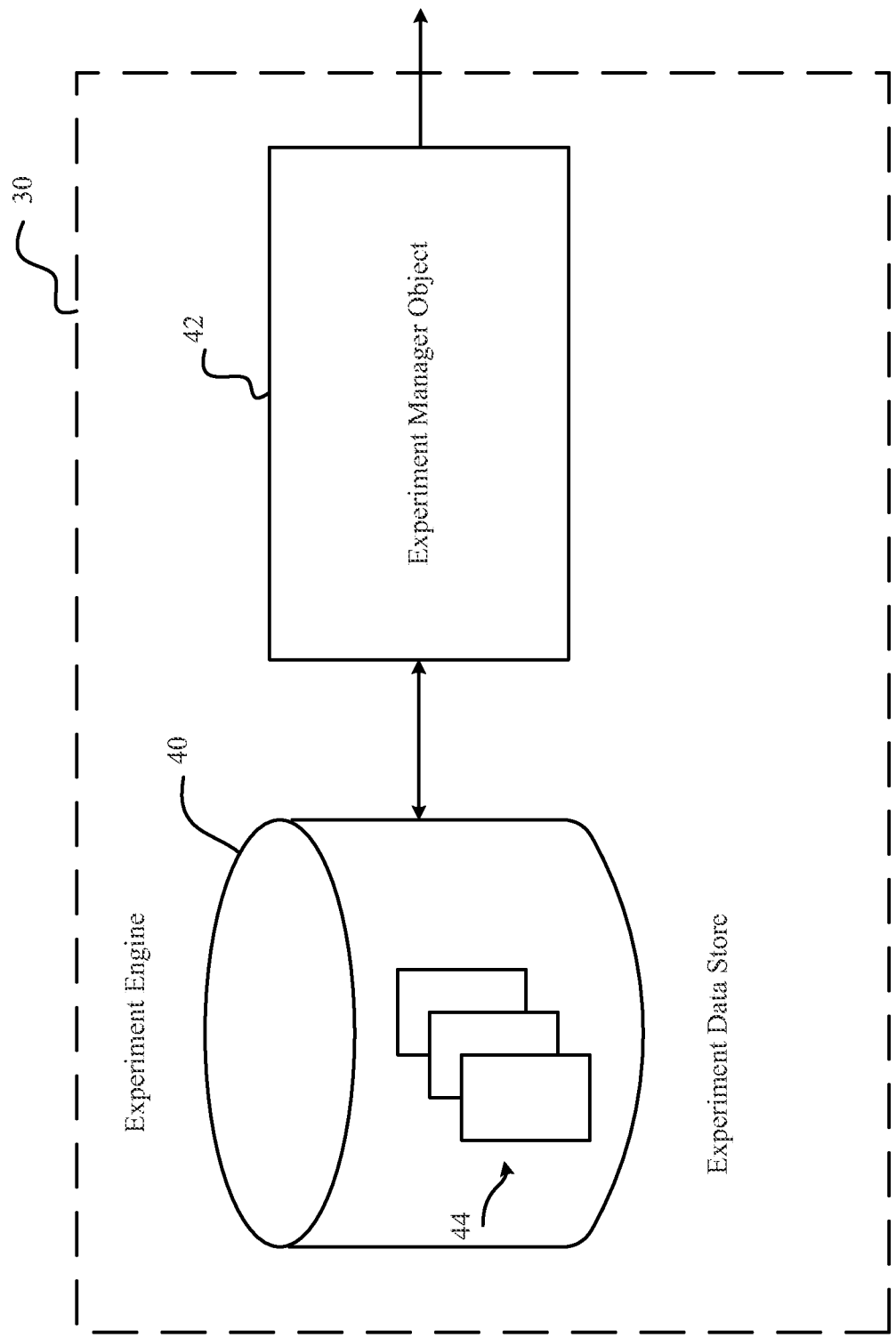
FIG. 3 is a block diagram for an experiment engine, according to an embodiment of the present invention.

FIG. 3 is a block diagram of an experiment engine 30, according to an embodiment of the present invention. Experiment engine 30 generally supports the creation and execution of one or more experiments to test the behavior or reaction of users 16 to particular content 15 and/or the particular way in which the content is formatted (i.e., treatments). In one embodiment, experiment engine 30 allows a manager user at content provider 14 to automatically select and implement a designed experiment from a variety of possible designed experiments especially suitable for interactive content experiments. As depicted, experiment engine 30 includes an experiment data store 40 and an experiment manager object 42.

Experiment manager object 42 generally functions to control or manage the execution of various experiments. Experiment manager object 42 allows the set-up of designed experiments. For example, experiment manager object 42 supports the specification of one or more experiment variables which can be investigated or considered as to their effects on one or more outcomes/objectives of interest. Such experiment variables can be, for example, background color, location on a web page, or special discount. Furthermore, for each experiment variable, experiment manager object 42 supports the specification of one or more levels. For example, for an experiment variable of background color, levels can include "blue," "pink," "yellow" and "green." For an experiment variable of location on a web page, levels can include "top center," "right bottom," "lower left," and "middle right." For an experiment variable of special so discount, levels can include "10% off," "15% off," "20% off" "25% off," "30% off," "35% off, "40% off," and so on. From the above, it can be seen that the experiment variables can be inherently discrete (e.g., background color) or inherently continuous (e.g., special discount). In one embodiment, the variables and associated levels can be selected by a manager user.

Once experiment variables and levels have been selected, experiment manager object 42 can specify different combinations or values of content 15. Experiment manager object 42 may generate the content structures or treatments to be delivered for each experiment and determine the conditions for delivery (e.g., to whom and when). To accomplish this, experiment manager object 42 may use any or all of the experiment engine functionality described herein (e.g., tables, search algorithms, etc.). Across these treatments, the levels for each experiment variable are systematically varied.

From the set of all possible content structures or treatments for a given set of content 15, a subset may be selected for experimentation. More specifically, experiment manager object 42 may select from the set of all possible treatments a sample of those in a particular way to optimally address the 5 desired objectives or outcomes. This allows communication management system 12 to investigate a larger number of, and more complicated, content issues than otherwise possible, while also insuring that the system (and therefore the manager user) will know which element of content had what effect on user behavior, and therefore what treatment is optimal for future delivery to site visitors. Each treatment of the selected subset may be considered to be a "control" content structure. Control implies that the different levels for experiment variables in the treatments are under the control of, or can be specified by, communication management system 12 or the manager user.

Experiment manager object 42 may also define or implement statistical sampling procedures. These statistical sampling procedures are used to select, from all users 16 visiting the website maintained by content provider 14, a number who will receive the control content structures or treatments. This selection can be accomplished using a combination of user-profiling (e.g., segmentation, which may include a segment comprising all users) and/or statistically valid random selection techniques. In one embodiment, experiment manager object 42 may allow a manager user at content provider 14 to specify, either implicitly or explicitly, a particular target population of users 16 to receive the control treatments. For example, experiment manager object 42 may 30 allowing a manager user to select a fraction of the total website traffic, and then design and implement an experiment that can be applied to a this fraction of the total traffic. With the sampling procedures available from experiment manager object 42, the manager user may set quotas for particular samples or for sampling from particular populations of users, wherein each population may have some characteristics in common (e.g., ISP, time of use, etc.).

Experiment manager object 42 may also specify when, and for how long, each experiment will be run, for example, based on input from a manager user.

Experiment manager object 42 may keep track of the experiments under way at a given time and the users 16 participating in each experiment. Experiment manager object 42 may also, via scripting/scheduling engine 39, direct other engines or elements in communication management system 12 or content system 10 to collect data and information about each experiment as it is being conducted. For example, experiment manager object 42 may direct allocator module 22 to collect observation data for the various experiments and to store this data in observation module 36. Thus it is possible to determine what experiments have been done, what experiments are underway, and what parts of the experimental space remain for experimentation. Furthermore, for each experiment, experiment manager object 42 may generate a set of rules which direct allocator module 22 on how treatments should be allocated during the course of the experiment.

In one embodiment, experiment manager object 42 may be implemented or comprise a set of interface objects which can be delivered between various components or modules of communication management system 12 and content system 10.

Experiment data store 40 is in communication with experiment manager object 42. Experiment data store 40 functions to store experiment data 44. Experiment data 44 generally comprises data and information relating to the experiments created and executed by experiment engine 30. This includes data/information for both past (historical) experiments and experiments currently in progress. For each experiment, experiment data 44 may specify, for example, the definitions and parameters defining the experiment, the content 15 which is used during the experiment, the variables specified for the experiment, the levels for each experiment variable, the content structures or treatments considered during the experiment, the objective behavior being tracked for each experiment, the experiment rules for each experiment, and a definition or recognition pattern for the users 16 who are allocated to participate in the experiment.

Experiment data 44 may also specify or include data used to set up the experiments. In one embodiment, this data may include one or more tables. Each table can be associated with a respective experimental design. These tables can be "filled in" with data and information entered, for example, by experiment manager object 42 (optionally cooperating with a manager user at the content provider 14), in order to create experiments specifically designed for the content provider 14. Experiment data store 40 also stores information relating to the ability of the content system 10 to experiment.

Experiment data store 40 may be implemented in any one or more suitable storage media, such as random access memory (RAM), disk storage, or other suitable volatile and/or non-volatile storage medium. In one embodiment, experiment data store 40 may comprise a relational database.

With experiment engine 30, communication management system 12 can select, from the set of all possible content structures or treatments for a given set of content 15, a sample with which to experiment to optimally address a desired objective or outcome. This allows communication management system 12, cooperating with content system 10, to investigate not only a large number, but also more complicated, content issues than otherwise possible. Communication management system 12 is thus able to determine which content structure or treatment had what effect on users 16, and therefore, what content is optimal for future delivery to other users.

Model Engine

Figure 4:
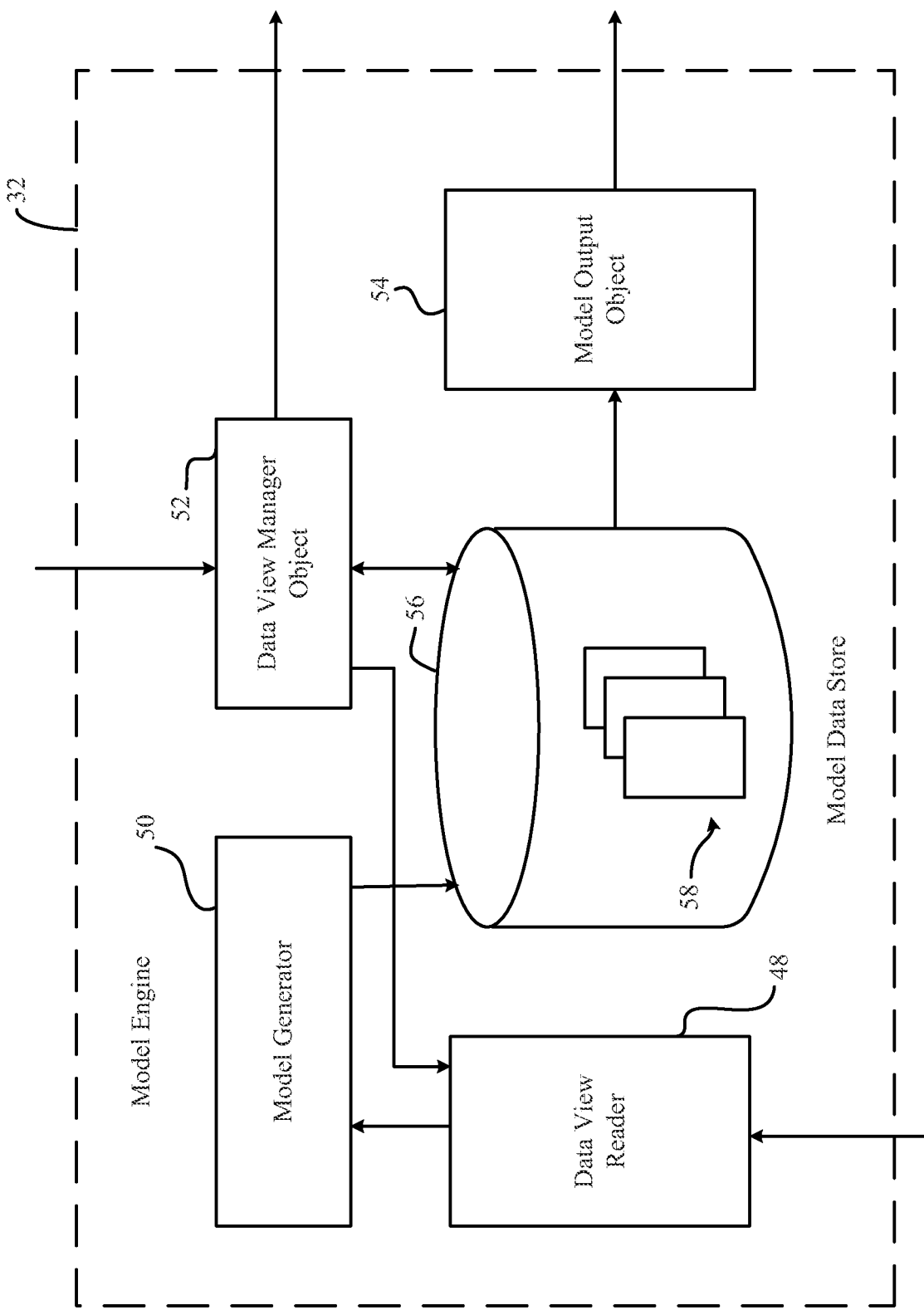
FIG. 4 is a block diagram for a model engine, according to an embodiment of the present invention.

FIG. 4 is a block diagram of a model engine 32, according to an embodiment of the present invention. Model engine 32 generally functions to create or build behavioral models from data gathered during experimentation. As depicted, model engine 32 includes a data view reader 48, a model generator 50, a data view manager object 52, a model output object 54, and a model data store 56.

Data view reader 48, which may be in communication with observation module 36, generally functions to retrieve or read observation data collected during experimentation. This observation data may include data relating to the treatments delivered to various users 16 during experimentation and the outcome for each delivery. At least some reactions of users 16 to various treatments can be observed (e.g., a user may ultimately purchase a product which is offered in a particular treatment), and thus, can be considered to be an objective behavior.

Model generator 50, which is in communication with data view reader 48, receives the observation data. Model generator 50 transforms the observation data into a format that can be statistically analyzed. Using the observation data, model generator 50 generates one or more behavioral models. These behavioral models may capture the relationship of the incidence of the objective behaviors, the set of controlled content variables (e.g., placement or background color of a banner advertisement), and users 16 to whom content is delivered. Choice models are behavioral in the sense that they describe how the probability of users' choices or decisions (i.e., their behavior) will vary as the levels for any number of variables are manipulated in an experiment. The models are useful for situations that involve interpolation for values not observed and/or predictions about treatments not 10 administered during experimentation. In one embodiment, model generator 50 may generate one or more contingency tables. Contingency tables are a form of model. Each contingency table can be a report which is useful for situations with a small number of defined outcomes. Contingency tables can be used to check that complex forms of models will succeed. By analyzing a contingency table, communication management system 12 can identify data that will cause complex models to fail an estimation step. Contingency tables are very complete and relatively fast forms of modeling.

Model generator 50 can be implemented with algorithms for choice modeling, Bayesian modeling, neural networks, decision trees, or other relevant modeling algorithms. At least some of these algorithms for modeling are publicly available, for example, in various academic publications or commercially available software. In one embodiment, model generator 50 can be implemented with MATLAB libraries and object code compiler.

Model data store 56 is in communication with model generator 50. Model data store 56 generally functions to store and maintain model data 58. Model data 58 can be any information and data for creating, describing, defining, and implementing the models described herein. For each model, model data 58 can specify, for example, an identifier for the model, variables describing the choice options available under the model (e.g., prices, discount levels, background colors), variables describing users 16 (e.g., time of day that user interacts, day of week that user interacts, Internet service provider (ISP) for the user, operating system for the user's computer, etc.), the contents of one or more legacy systems, demographic information, etc.

Model data storage 56 may be implemented in any one or more suitable storage media, such a random access memory (RAM), disk storage, or other suitable volatile and/or non-volatile storage medium. In one embodiment, model data store 56 may comprise a relational database.

Data view manager object 52 is in communication with model data store 56 and data view reader 48. Data view manager object 52 generally functions to output the various models to a human user (e.g., information system manager) at content provider 14 via data view reader 48 for interpretation by the same. In one embodiment, data view manager object 52 may be implemented or comprise a set of interface objects which can be delivered between various components or modules of communication management system 12 and content system 10.

In one embodiment, content provider 14 may store user information in separate databases which may be incorporated into model data store 58. For example, an on-line banking application supported by a content provider 14 may draw data from a user's Internet session as well as from a financial institution's corporate database. In such case, data view manager object 52 would link the corporate database to model data store 56.

Model output object 54 is in communication with model data store 56. Model output object 54 generally functions to output the various models to prediction engine 34 for conversion or use as predictions. In one embodiment, model output object 54 may be implemented or comprise a set of interface objects which can be delivered between various components or modules of communication management system 12 and content system 10.

Prediction Engine

Figure 5:
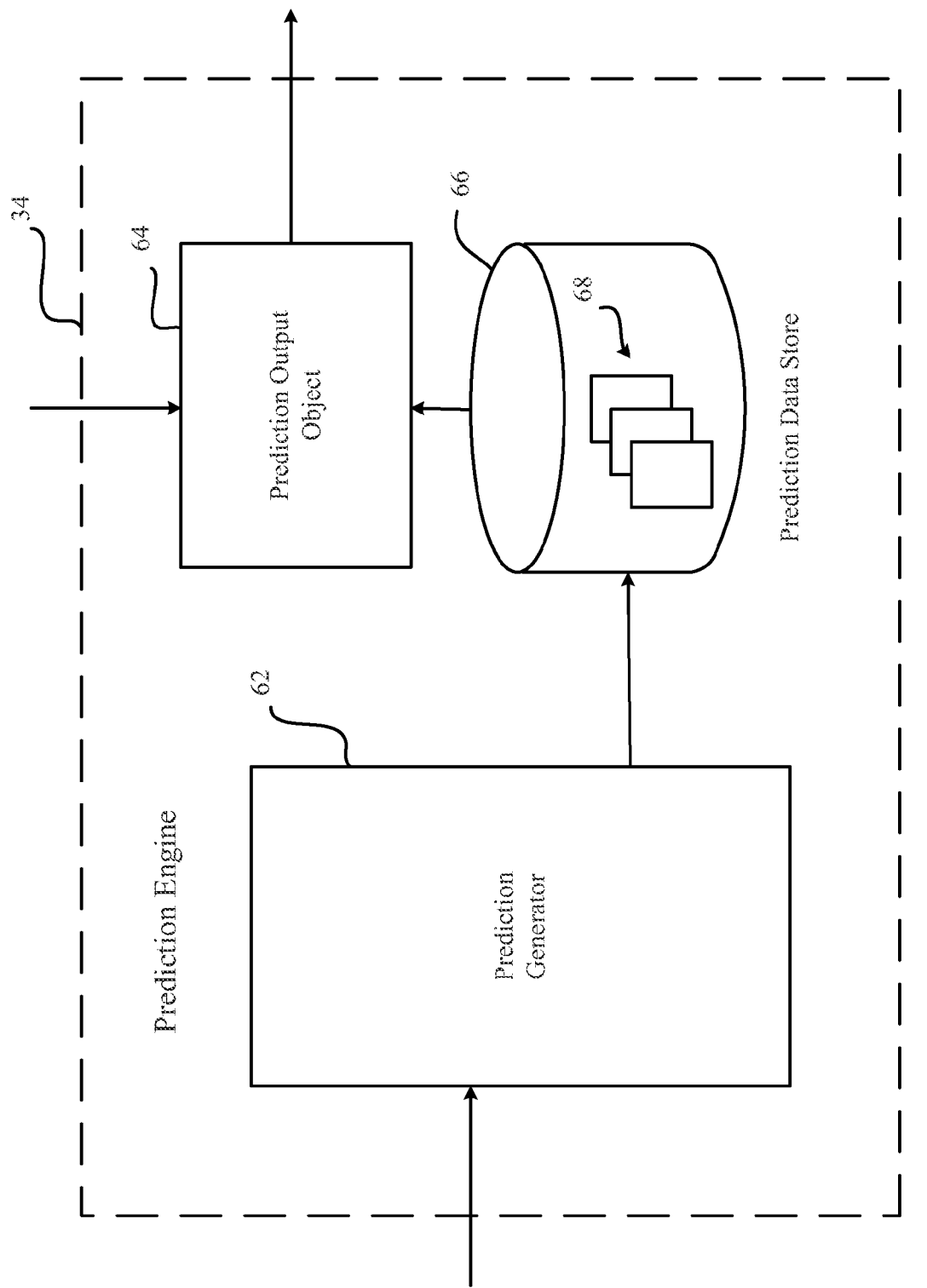
FIG. 5 is a block diagram for a prediction engine, according to an embodiment of the present invention.

FIG. 5 is a block diagram of a prediction engine 34, according to an embodiment of the present invention. Prediction engine 34 generally functions to create or build predictions using behavioral models. As depicted, prediction engine 34 includes a prediction generator 62, a prediction output object 64, and a prediction data store 66.

Prediction generator 62 generally functions to generate one or more predictions which predict, for example, how various users 16 may react to particular content. These predictions may be considered to be a mass customization process. The predictions use the revealed (observed) preferences of users 16 as embodied in a model to generate statistically viable prediction rules. Prediction generator 62 may receive input from model engine 32 and content provider interface 38 to develop rules for targeting content 15 to specific users 16 in order to achieve desired objectives/ outcomes (e.g., sales of a product), thus optimizing the delivery of content 15. This can be accomplished by converting various models output by model engine 32.

In one embodiment, prediction generator 62 may implement a personalization process. In the area of interactive communications, a personalization process can be a process whereby content 15 is targeted and delivered to users 16 based on either their stated or implied preferences. An exemplary personalization process may comprise data mining techniques used to profile or segment users 16. Segmentation refers to the breakdown, division, or separation of users 16 into various, discrete groups or segments. Each grouping or segment can be a specification or distribution of users with similar behavioral characteristics. The behavior of users 16 within a given segment tends to be more homogenous, whereas the behavior of users 16 between segments tends to be less homogenous. Segments can range from none (a mass undifferentiated market) to unique individuals.

Segments of users 16 can be determined in the modeling process based upon information identified for particular users 16 who are disposed to react in unique ways towards the content 15 as observed in their site related behavior. To implement segmentation, the defining information for each segment is tracked for user interactions. This can be accomplished with segmentation rules. A separate set of segmentation rules can be programmed or provided for each segment of users 16. These rules may specify details for delivering content 15 to users 16. For example, for each segment, the respective set of rules may specify which content 15 should be delivered at what time. Alternatively, a manager user at content provider 14 can select predefined segments a priori.

Prediction generator 62 converts predictive models generated by model engine 32 into optimized rule sets, which are known as predictions. That is, prediction generator 62 may perform an optimization process that removes information about unsuccessful content combinations or treatments from content system 10 and/or communication management system 12, thus leaving only information for content combinations or treatments worthy of being used.

By removing such non-useful data, prediction generator 62 enhances the resultant real time processing speed. For any given model operated upon by prediction generator 62, the conversion to a rule set is done to map the model back to terms understandable by the content system. It is possible to accept in this process separate models for various sub-populations of users 16 and/or include characteristics of individual users that drive differences in their behavior in the models.

As such, the techniques and functionality of prediction generator 62 allow inclusion and analysis of many individual characteristics of users 16, as well as different ways in which the characteristics can combine to drive differences in behaviors. For example, the time of day may be associated with differences in the propensity of various users 16 to 15 click-through a website, all other factors being the same. Furthermore, the time of day may be associated with differences in the sensitivity of users to attributes like offer price or position on page.

Prediction generator 62 may receive input from a manager 20 user, for example, to specify particular segments for investigation and optimization of content delivery. Through content provider interface 38, a manager user may specify identification rules based on data, fields, and values available in the observation module 36 or from the content provider's own customers (users) or site databases.

Prediction data store 66 is in communication with prediction generator 62. Prediction data store 66 generally functions to store and maintain prediction data 68. Prediction data 68 can be any information and data for creating, describing, defining, and implementing the predictions described herein. For each prediction, prediction data 68 can specify, for example, an identifier for the prediction, a set of rules for the prediction, definitions describing classes of users 16, and the content 15 which is best for each class.

Prediction data store 66 may be implemented in any one or more suitable storage media, such as random access memory (RAM), disk storage, or other suitable volatile and/or non-volatile storage medium. In one embodiment, prediction data storage 66 may comprise a relational database.

Prediction output object 64 is in communication with prediction data store 66 and data view reader 48 (of model engine 32). Prediction output object 64 may output the various prediction rules to the content system 10 for application during delivery of content 15 to users 16. In one embodiment, prediction output object 64 may be implemented or comprise a set of interface objects which can be delivered between various components or modules of communication management system 12 and content system 10.

In some applications which involve extensive content or large amounts of user data, the size of the set of prediction rules may be larger than practicable for review by a human user (e.g., manager user). To allow for practicable human review, prediction engine 34 may incorporate or include one or more rules-reduction algorithms for generating a reduced ruleset. Thus, when desired, a manager user may interact with prediction engine 34 to request a reduced ruleset.

In one exemplary implementation for a rules-reduction process, users 16 are searched and clustered together according to similarities or differences in their characteristics and optimal content. These clustered groups function as segments for implementing predictions. In another exemplary implementation for a rules-reduction process, segments are simultaneously searched during the modeling process. In yet another exemplary implementation, cost functions are used to constrain the model to produce a reasonably small number of distinct prediction rules.

Observation Module

Figure 6:
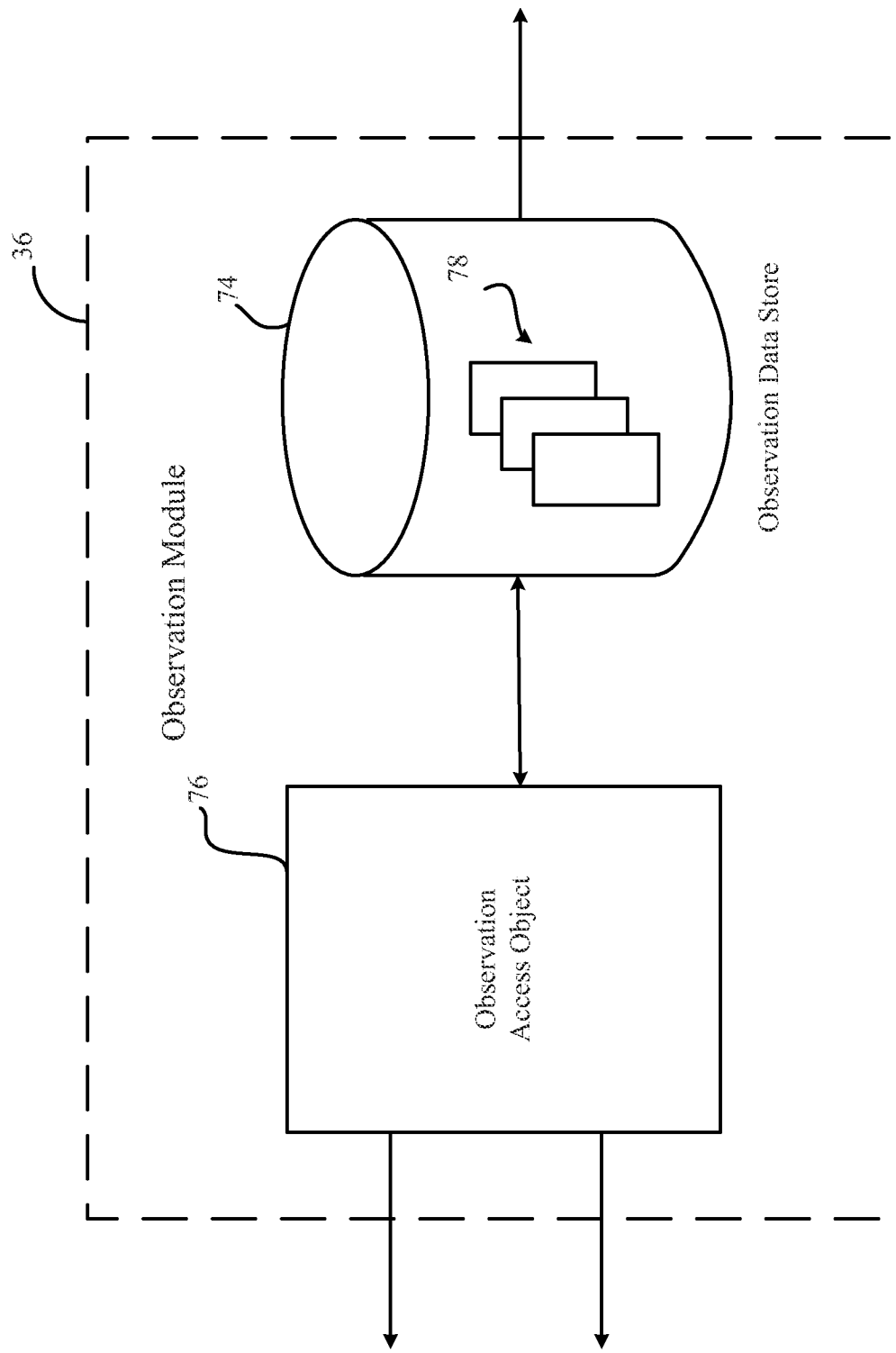
FIG. 6 is a block diagram for an observation module, according to an embodiment of the present invention.

FIG. 6 is a block diagram of an observation module 36, according to an embodiment of the present invention. As depicted, observation module 36 comprises an observation data store 74 and an observation access object 76.

Observation data store 74 generally functions to maintain 10 or store observation data 78. Observation data 78 can be data or information relating to the observed behavior of users 16 which visit the website of content provider 14. Observation data 78 may thus specify, for example, the users 16 which visit the website, an Internet Protocol (IP) address for each user, the experimental conditions under which content 15 is delivered to each user, the observed outcomes or results of each visit, one or more experiment variables, one or more predictive covariates, one or more dependant variables, time stamps for each visit, and other useful data which can be used during analysis. At least a portion of observation data 78 may constitute raw information and basic statistics for observations. Observation data 78 may be maintained as structures which are appropriate for viewing and modeling the results by user (e.g., visitor), treatment, session, and user profile. Observation data 78 may allow communication management system 12 and content system 10 to deliver the same treatment to a user 16 who returns to the website (e.g., assuming such user returns from an identical IP address). Observation data store 74 may supply observation data 78 to a manager user via content provider interface 32.

Observation access object 76 is in communication with observation data store 74. Observation access object 76 generally functions to provide access to (storage or retrieval of) the observation data 78. Observation access object 76 may transfer observation data 78 to the model engine 32 in a form that is directly appropriate for modeling. The transfer process may involve checking the observation data 78 for data "pathologies" (e.g., missing data, structural dependencies, etc.) and transforming the data to model ready form (e.g., categorization and effects coding). In one embodiment, observation access object 76 may be implemented or comprise a set of interface objects which can be delivered between various components or modules of communication management system 12 and content system 10.

In some instances, content provider 14 may store user information in separate databases which may be combined with other data in observation data store 74. For example, an on-line banking application supported by a content provider 14 may draw data from a user's Internet session as well as from a financial institution's corporate database. In such case, observation access object 76 would link the corporate database to observation data store 74.

Scripting/Scheduling Engine

Figure 7:
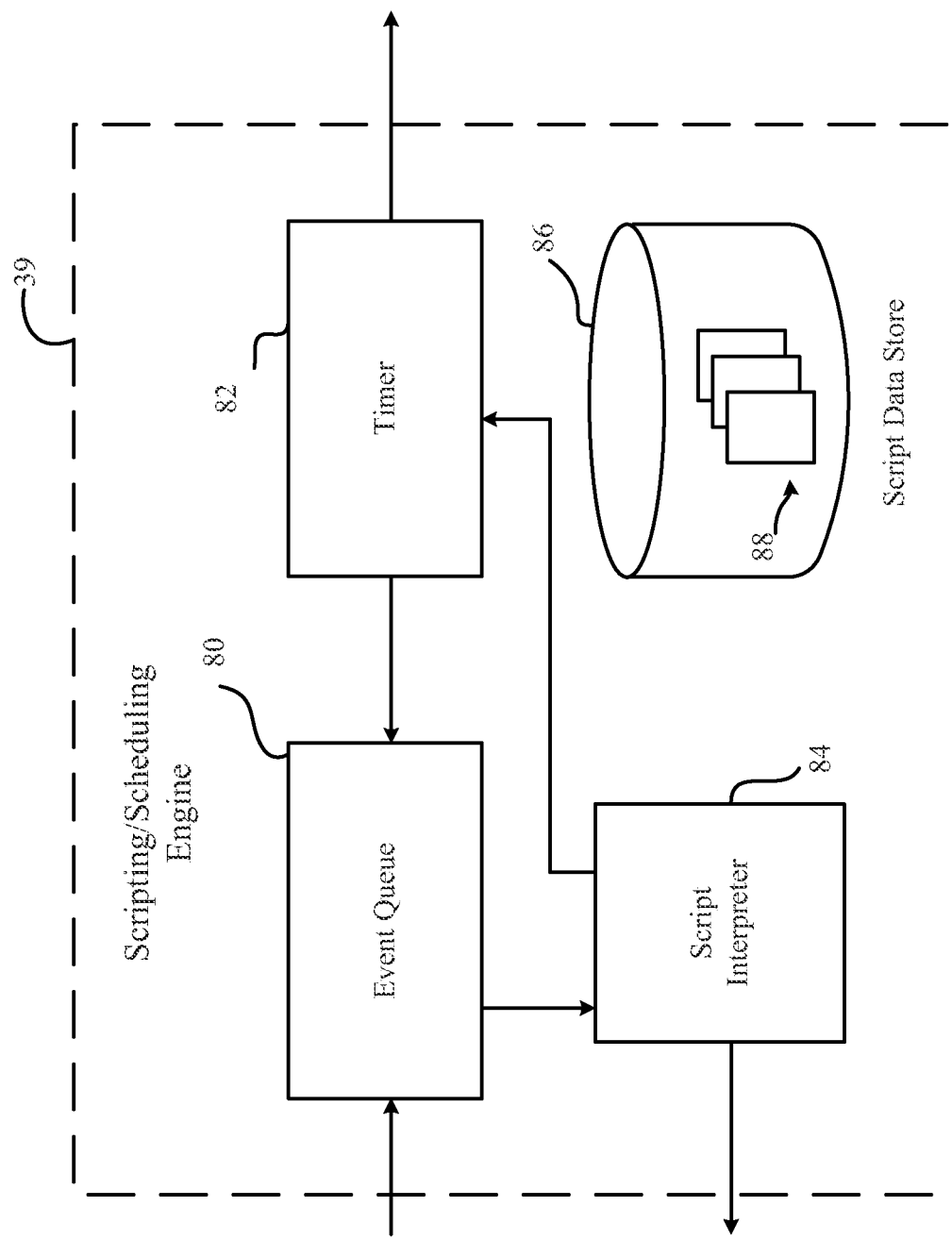
FIG. 7 is a block diagram of a scripting/scheduling engine, according to an embodiment of the present invention.

FIG. 7 is a block diagram of a scripting/scheduling engine 39, according to an embodiment of the present invention. As previously described, scripting/scheduling engine 39 generally functions to coordinate and automate the operation of the other elements in communication management system 12 and content system 10. As depicted, scripting/scheduling engine 39 comprises an event queue 80, a timer 82, a script interpreter 84, and a script data store 86.

Script interpreter 84 generally functions to run the various 65 scripts which provide instructions or directions to other engines and modules in communication management system 12 and content system 10 (e.g., allocator module 22, experiment engine 30, model engine 32, prediction engine 34, or observation module 36). These scripts may initiate or cause some action to be taken in communication management system 12 or content system 10 in response to various events. Each script may specify a sequence or series of instructions which are issued to other engines and modules in systems 10 and 12 in order to coordinate the operation of the same.

An event can be, for example, the completion of some task by one of the various modules or engines in communication management system 12 or content system 10. Notification of each such event may be conveyed by the relevant module or engine to scripting/scheduling engine 39. An event may also relate to the occurrence of a predetermined time (e.g., 8:00 a.m.) or the lapse of a predetermined amount of time (e.g., two hours). Timer 82 keeps track of time and generates information for each event which is time-related.

Event queue 80, which is in communication with script interpreter 84, receives and stores information for each event of which scripting/scheduling engine 39 is notified or which is generated internally. Event queue 80 implements a queue for handling one or move events. These events can be specified in various scripts and may serve to trigger the issuance of instructions by script interpreter 84. In other words, for each event, script interpreter 84 may initiate or cause some action to be taken in communication management system 12 or content system 10 according to the particular script.

For example, an event can be the completion of an experiment by experiment engine 30, in which case, script interpreter 84 may desirably initiate the generation of a respective model using the results of experimentation. Thus, using the data produced by the various modules and engines, along with diagnostic information, script interpreter 84 may determine whether or not the modules or engines have completed their respective tasks successfully and initiate appropriate action by issuing respective instructions.

Script data store 86, which is in communication with script interpreter 84, generally functions to maintain or store script data 88. Script data 88 can be data or information relating to the various scripts generated and run by script interpreter 84. For each script, script data 88 may thus specify, for example, an identifier for the script, the instructions which are part of the script, the sequence in which the instructions should be issued, the events which should trigger the issuance of instructions, the modules or engines to which instructions should be issued, etc.

Method for Managing Content

Figure 8:
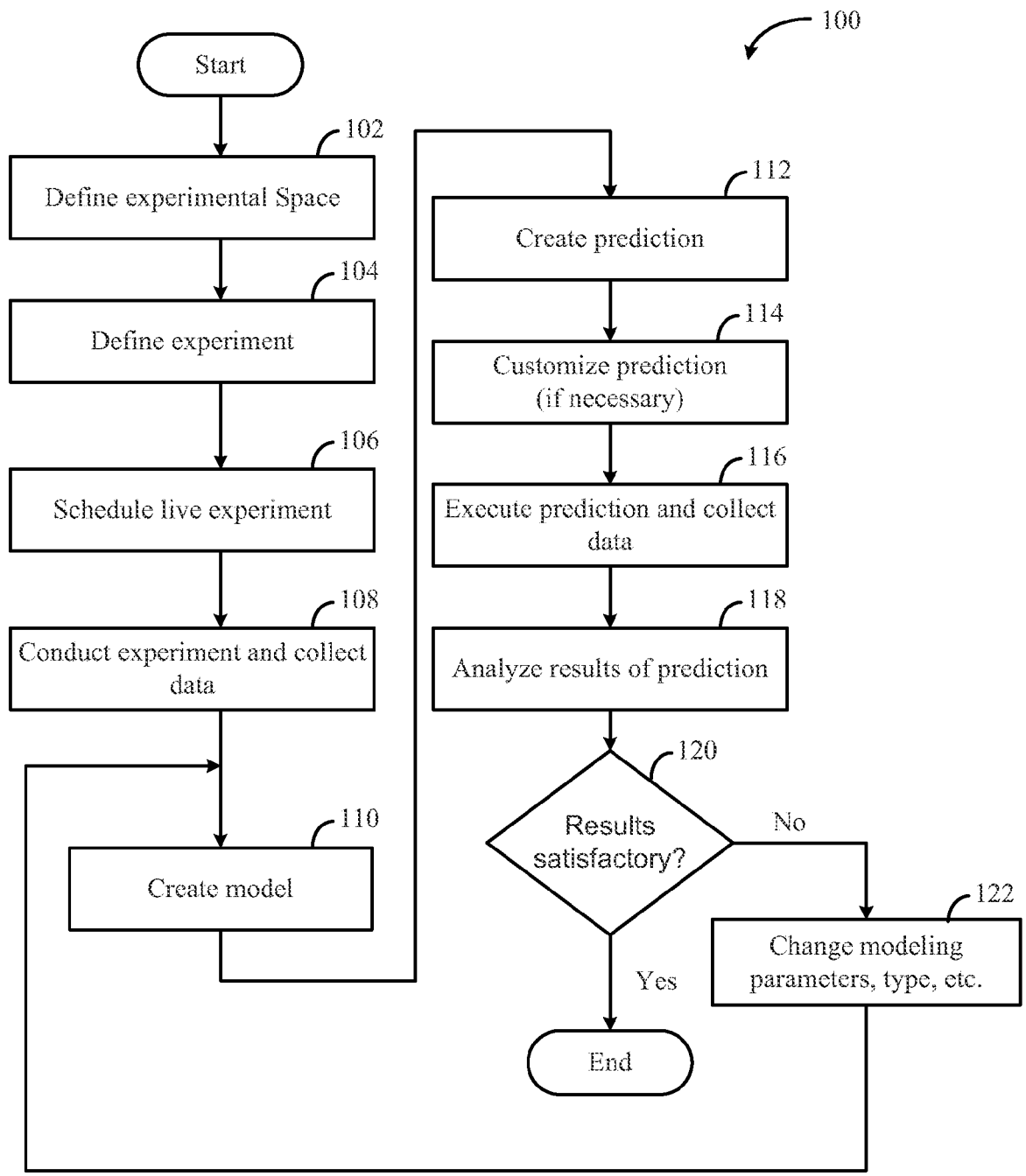
FIG. 8 is a flowchart of an exemplary method for managing content delivered to users, according to an embodiment of the present invention.

FIG. 8 is an exemplary method 100 for managing the content delivered to users, according to an embodiment of the present invention. Method 100 may correspond to various aspects of the operation of communication management system 12 cooperating with content system 10.

Method 100 begins at steps 102 and 104 where communication management system 12, cooperating with content system 10, defines an experimental space and an experiment. In one embodiment, experiment engine 30 may generate 60 various definitions for the experiments and corresponding experimental space. These definitions may specify a particular set of content 15 which will be the subject of the experiments, one or more treatments into which the content 15 is arranged, the time period over which each experiment will be conducted, the control groups of users 16 to whom treatments will be delivered, the experiment rules which govern delivery of content treatments, the behavior of users 16 that should be monitored, the objectives/outcomes that are desirably achieved, etc. In one embodiment, a manager user at content provider 14 may interact with communication management system 12 to design the experiments.

At step 106, experiment engine 30 schedules live experiments for delivering particular treatments to respective control groups of users 16. At step 108, experiment engine 30, working in conjunction with allocator module 22, conducts the defined experiments and collects data relating to the observed behavior of users. In one embodiment, allocator module 22 may apply the experiment rules for delivering the various treatments to specific control groups. This may be done in response to user requests for content 15. Allocator 15 module 32 may store details regarding the observed behavior of users, as related to the objectives to be optimized or otherwise, in observation module 36.

At step 110, model engine 32 creates a model using the collected data/information for observed behavior. The model may reflect the degree to which the content elements influence the behavior or choices of users 16. In particular, the behavioral model may comprise a sophisticated, continuous, and discrete multivariate statistical model which can be used to determine what aspects of a content structure or treatment 25 influences the probability of achieving a particular outcome.

At step 112, prediction engine 34 creates or generates a prediction. This prediction can be a simple description of a model which is used to deliver content 15 to users 16 in a way which is most effective to achieve the desired outcomes/ objectives. The prediction can be implemented in part with a set of prediction rules, which target specific content to particular kinds of users. At step 114, communication management system 12 allows a manager user at content provider 14 to customize the prediction if desired.

At step 116, communication management system 12 cooperates with content system 10 to execute the prediction and collect data. In particular, allocator module 22 may apply the prediction rules to deliver content 15 in response 40 to requests by users 16. This results in the delivery of particular treatments to various users 16 depending on certain criteria (e.g., time of day, click trail, etc.). Data relating to the behavior of users 16 to the respective treatments is collected. At step 118, model engine 32 and prediction engine 34 may cooperate to analyze the results of the delivery of treatments during the prediction phase.

At step 120, communication management system 12 determines whether the observed results are satisfactory. That is, communication management system 12 determines whether users 16 have reacted in the desired manner to the content treatments which were delivered, thus achieving the desired outcomes or objectives. If the observed results are not satisfactory, then at step 122 model engine 32 changes the modeling parameters, type, etc., after which method 100 returns to step 110 where a new model is created. Method 100 repeats steps 110 through 122 until it is determined at step 120 that the results of prediction are satisfactory. At that point, method 109 ends.

Method for Defining an Experiment

Figure 9:
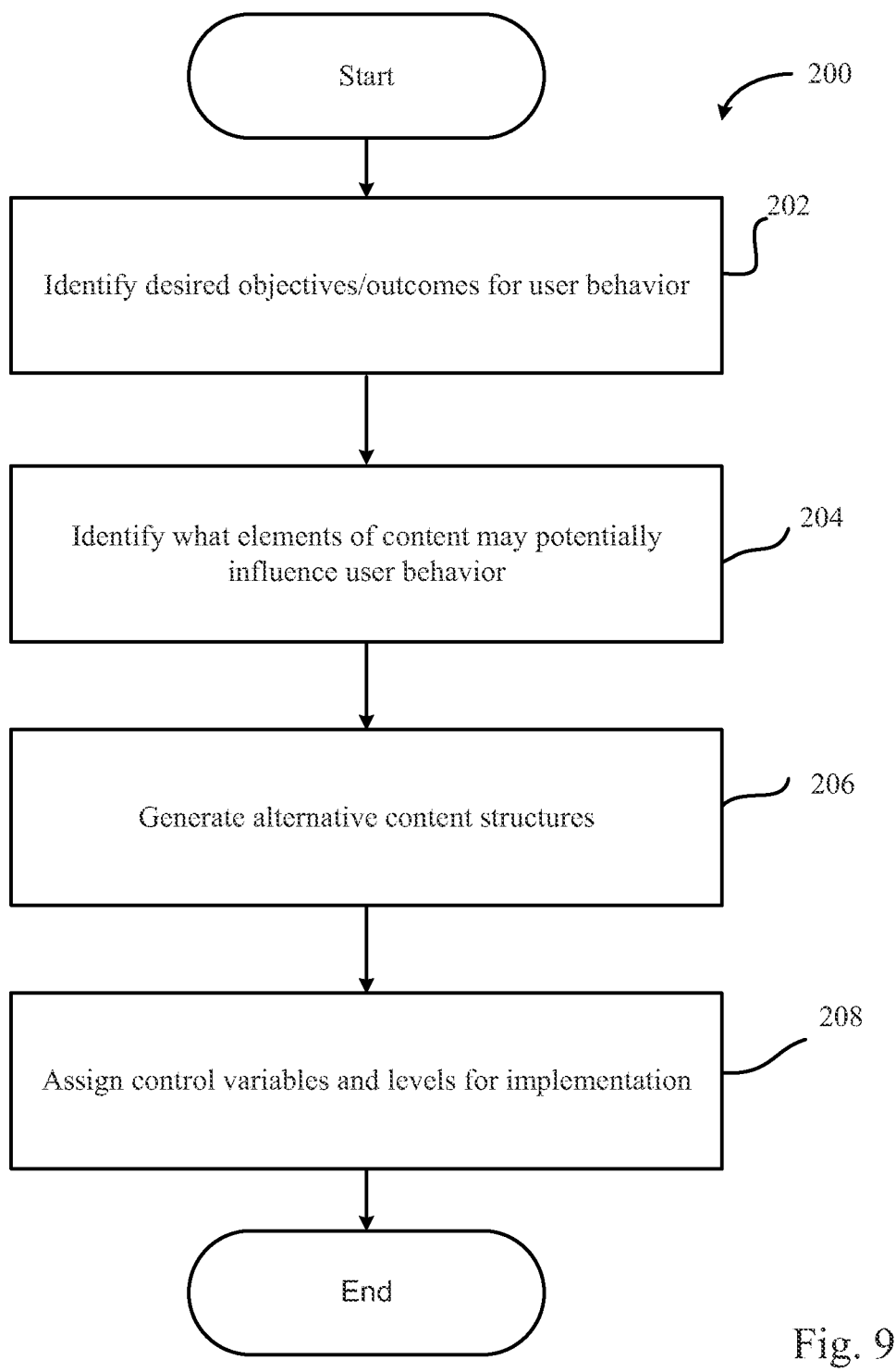
FIG. 9 is a flowchart of an exemplary method for defining an experiment for structured content, according to an embodiment of the present invention.

FIG. 9 is a flowchart of an exemplary method 200 for defining an experiment for structured content, according to an embodiment of the present invention. Method 200 may correspond to various aspects of operation of experiment 65 engine 30 of communication management system 12.

Method 200 may be performed for each experiment carried out by communication management system 12 cooperating with content system 10. Each experiment may focus or concentrate on a particular set of content 15 which can be stored in content system 10. Any set of content 15 can include, for example, written text, images, graphics, animation, video, music, voice, and the like. Elemental 5 components of content can be a text file, an image file, an audio file, a video file, etc.

Method 200 begins at step 202 where, for the present experiment, experiment engine 30 identifies the desired objectives/outcomes for user behavior. Such outcomes or objectives can be, for example, increasing sales and profits, improving electronic marketing effectiveness, and powering specific business intelligence applications. In one embodiment, the desired objectives/outcomes can be identified or selected by a manager user of content provider 14, via content provider interface 38. At step 204, experiment engine 30 identifies which element components of the particular set of content 15 may potentially influence user behavior related to the desired objectives/outcomes. This can be part of a designed experiment.

At step 206, experiment engine 30 generates a number of alternative content structures or treatments using various combinations of the elemental components. Each content structure or treatment can be, for example, a particular implementation of a web page. These alternative content structures may vary in the elemental components for one or more experiment variables under the control of communication management system 12. These variables can be, for example, background color, screen placement, size of content, etc. Different values or levels may be available for 30 each variable. For example, for a variable of background color, different levels can be red, blue, gray, and black. For a variable of screen placement, different levels can be top center, right bottom, lower left, etc. The various treatments may be alternately delivered in response to the same request for content, as described herein.

At step 208, experiment engine 30 assigns control variables and levels for implementation of the experiments. This yields a number of alternate content structures or treatments for the particular set of content 15 of the present experiment. For example, in one treatment, a banner advertisement may have a background color of yellow and be placed in the top right corner of a screen, whereas in another treatment, a banner advertisement may have a background color of blue and be placed in the middle left portion of a screen. These alternate treatments for content 15 may be delivered to users 16 during experimentation. Afterwards, method 200 ends.

Method for Conducting an Experiment and Collecting Data

Figure 10:
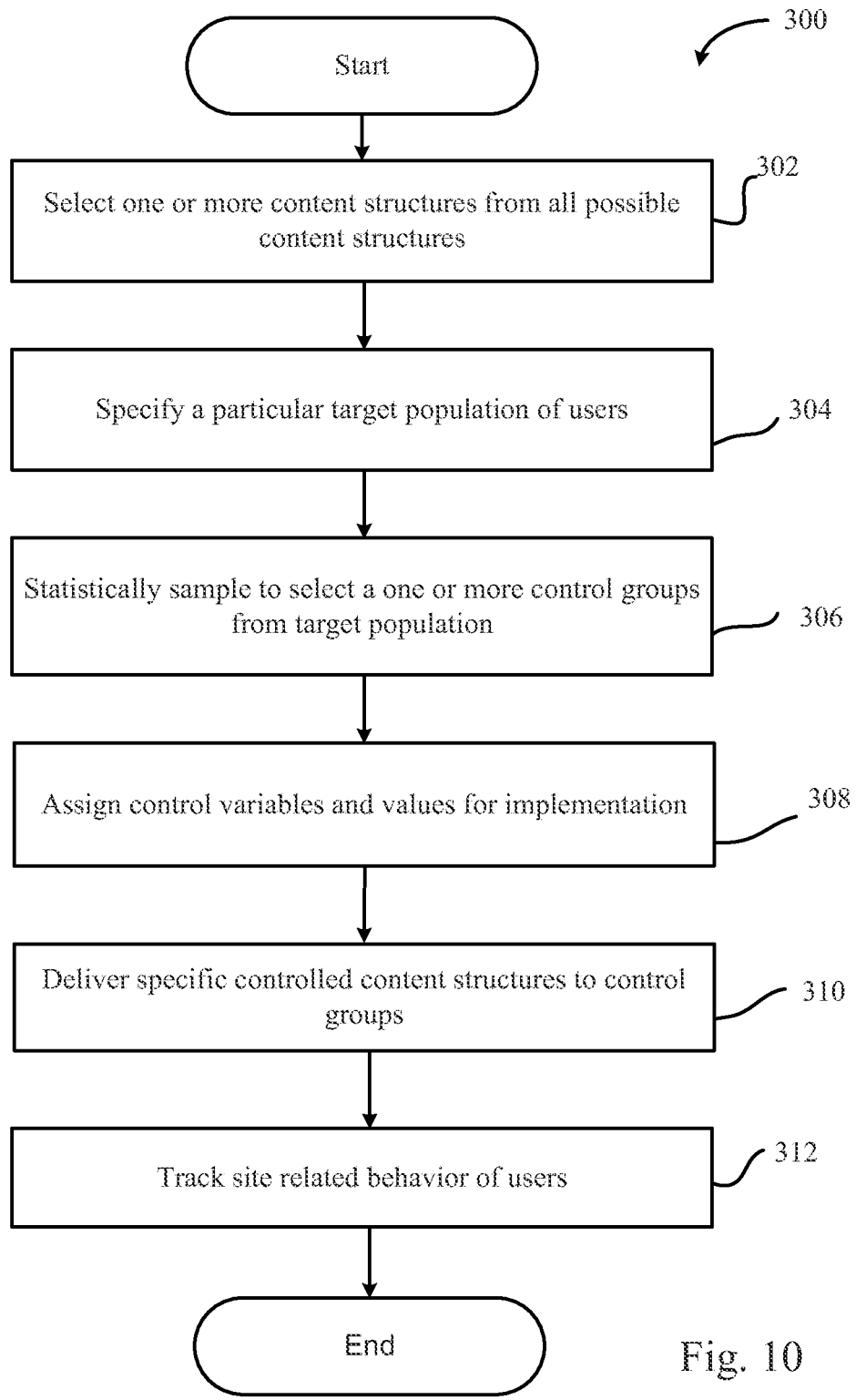
FIG. 10 is a flowchart of an exemplary method for conducting an experiment and collecting data for trackable outcomes/objectives, according to an embodiment of the present invention.

FIG. 10 is a flowchart of an exemplary method 300 for conducting an experiment and collecting data for trackable outcomes/objectives, according to an embodiment of the present invention. Method 300 may correspond to various aspects of operation of communication management system 12 cooperating with content system 10.

Method 300 begins at step 302 where experiment engine 30 and scripting/scheduling engine 39 select one or more content structures or treatments for delivery to users 16 during the present experiment. Each treatment can be a particular format for content 15 to be presented on a web page. For example, one treatment for the content of a web page can include a blue background on which photographs of each article are displayed from top to bottom on the left side of the screen, with accompanying descriptions provided on the right side next to each photograph. Another treatment for the content can include a red background on which photographs of each article are displayed from left to right on the top of the screen, with the accompanying descriptions provided beneath each photograph at the bottom of the screen.

These treatments may be alternately delivered in response to the same request for content. An exemplary request can be a request for a web page displaying a particular line of products (e.g., several articles of clothing). Such web page request can specify a particular identifier for the web page, such as, for example, a uniform resource locator (URL). Furthermore, the web page request can be related to a user's action of clicking on a particular hyperlink on a web page.

At step 304, communication management system 12 specifies a particular target population or segment of users 16 to receive the selected treatments. In one embodiment, a manager user may explicitly specify a particular target population of site users. For example, a target population can be those users who access a particular web page between the hours of 4:00 p.m. and 10:00 p.m. on weekdays. At step 306, allocator module 22 statistically samples to select one or more control groups of users 16 from a target population. For example, in one embodiment, statistical sampling procedures are used to select from all site visitors a profile-matched, random sample who will receive the control treatments as described herein. Each control group may comprise one or more users 16 who request content from content provider 12. Each control group may receive a different treatment during experimentation in response to identical requests for content. At step 308, communication management system 12 assigns control variables and values/levels for implementation, thereby specifying which treatment will be delivered to each control group.

At step 310, allocator module 22, via user interface 26, allocates or delivers the respective treatment to each control group. Various users 16 making identical requests to the website of content provider 14 (e.g., by specifying the same URL or clicking on the same hyperlink) may be delivered different treatments during the experimentation. With reference to the example described above, a first control group requesting information about the line of clothing may receive the treatment with a blue background and vertically positioned photographs, while a second control group requesting the same information may receive the treatment with a red background and horizontally positioned photographs. Allocator module 22 may store or record information on the control treatments and delivery to respective control groups in observation module 36.

At step 312, communication management system 12, cooperating with content system 10, tracks the site-related behavior of users 16 receiving the various treatments. This behavior can be an indicator for how favorably or unfavorably the users viewed the different treatments. Continuing with the immediate example, forty percent of the users in the first control group may actually purchase an item of clothing when presented with the treatment comprising a blue background and vertically aligned photographs, while only fifteen percent of the users in the second control group may actually purchase an item of clothing when presented with the treatment comprising a red background and horizontally aligned photographs. Communication management system 12 records information and data relating to such user behavior. This information or data can include dependent variable information, which is associated with the desired objectives/ outcomes. All of this information may be stored into observation module 36 as observation data 78.

In one embodiment, user behavior can be categorized into various states. These states can be, for example, a decision to purchase a good, a decision not to purchase a good, a decision to remain at a particular web page, a decision to move to another web page, etc. Across the different control groups, communication management system 12 may record each change of state of user behavior for the various 5 treatments to identify how differences in treatment influence the changes in state. Method 300 may then end.

Method for Modeling and Predicting

Figure 11:
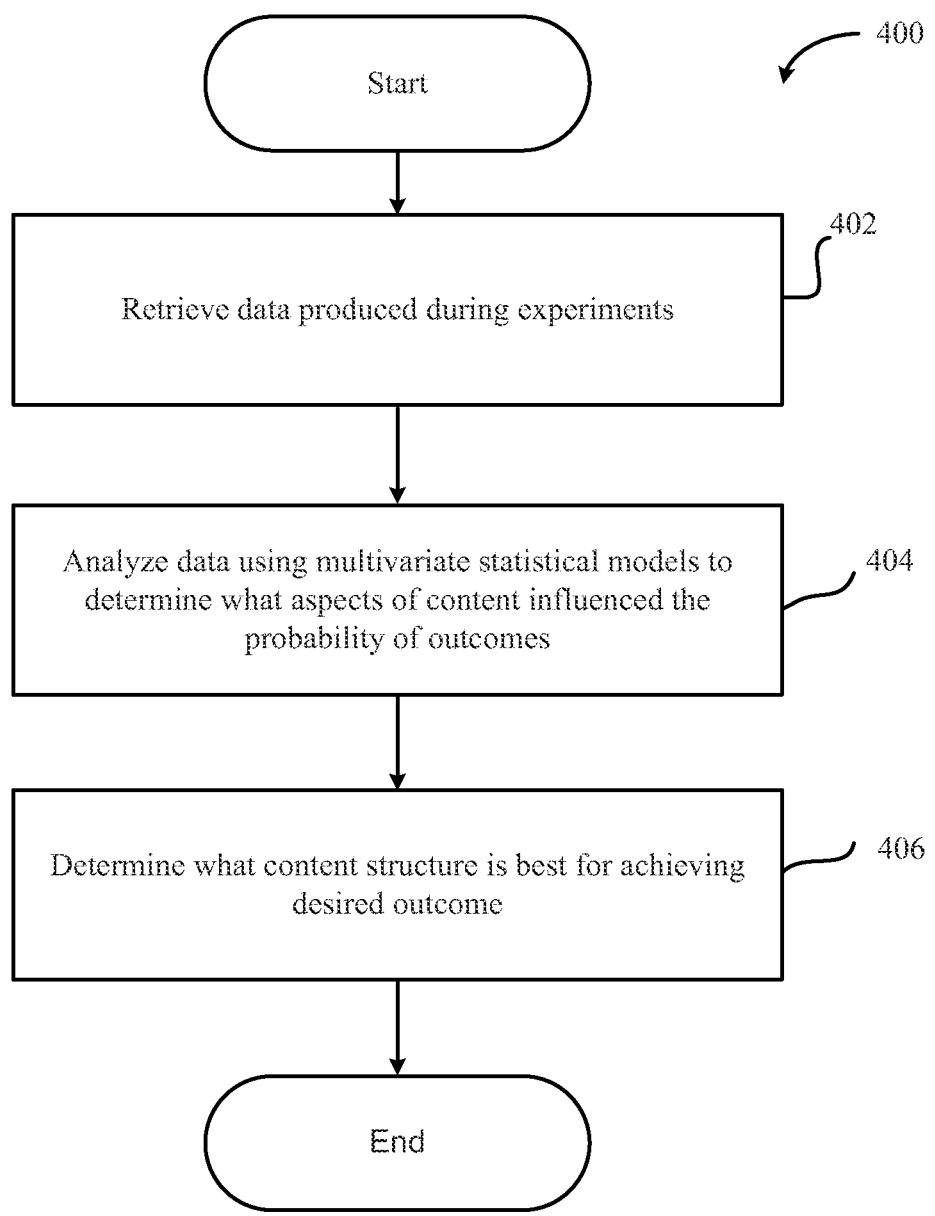
FIG. 11 is a flowchart of an exemplary method for modeling and predicting, according to an embodiment of the present invention.

FIG. 11 is an exemplary method 400 for modeling and predicting, according to an embodiment of the present invention. Method 400 may correspond to various aspects of operation of model engine 32 and prediction engine 34 of communication management system 12.

Method 400 begins at step 402 where model engine 32 retrieves, from observation module 36, observation data produced during the experiments conducted in part by experiment engine 30. This observation data includes data or information relating to the observed behavior of users 16 which visit the website of content provider 14. Among other things, the observation data may specify, for example, the users 16 which visit the website of content provider 14, the experimental conditions under which content 15 is delivered to each user, the observed outcomes or results of each visit, and one or more dependent variables related to the behavior 25 observed during each visit.

At step 404, model engine 32 analyzes the observation data using multivariate statistical modeling techniques (e.g., Bayesian Markov Chain Monte Carlo estimation procedures) to determine what aspects (type and format) of content 15 influenced the probability of outcomes. To accomplish this, model engine 32 may analyze or consider the various dependent variables related to the behavior observed during experimentation. Model engine 32 may generate one or more predictive covariates.

At step 406, using the results of the analysis, model engine 32 in cooperation with prediction engine 34 determines what content structure or treatment is best for achieving some desired outcome or objective. In particular, model engine 32 and prediction engine 34 generate a prediction, for example, for how various users 16 may react to particular content. This can be done by converting a model into a set of prediction rules. The prediction rules target content 15 to specific users 16 in order to achieve desired objectives/ outcomes (e.g., sales of a product), thus optimizing the delivery of content 15. Method 400 then ends.

Optimized Selection of Treatments for Delivery to Control Groups

According to an embodiment, the selection of treatments for delivery to control groups during an experiment is optimized to provide treatments estimated to greatest probability of satisfying one or more objectives of the experiment. As described above, the content system 10 shown in FIG. 2 delivers treatments to users during the experiment, and the observation module 36 in the communications management system 12 functions to store observation data. The observation data includes information relating to the observed behavior of users interacting with the treatments. This can include information for the experimental conditions and the observed outcomes.

According to an embodiment, confidences are determined for treatments delivered to the control groups using the observation data for the delivered treatments. A confidence for a treatment is an estimation of an ability of the corresponding treatment or a combination of content elements in the treatment to be used to satisfy one or more objectives. These confidences are used to determine weightings for new treatments, and the weightings are used to determine proportions of treatments to be delivered to the control groups. In one example, treatments or combinations of content elements having higher confidences (e.g., representative of having greater ability to satisfy one or more objectives) are given higher weights. Then, the higher-weighted treatments are delivered in greater proportion than lower-weighted treatments to the control groups. This minimizes the delivery of sub-optimal treatments throughout the experimental process, thereby reducing the time of experimentation.

Figure 12:
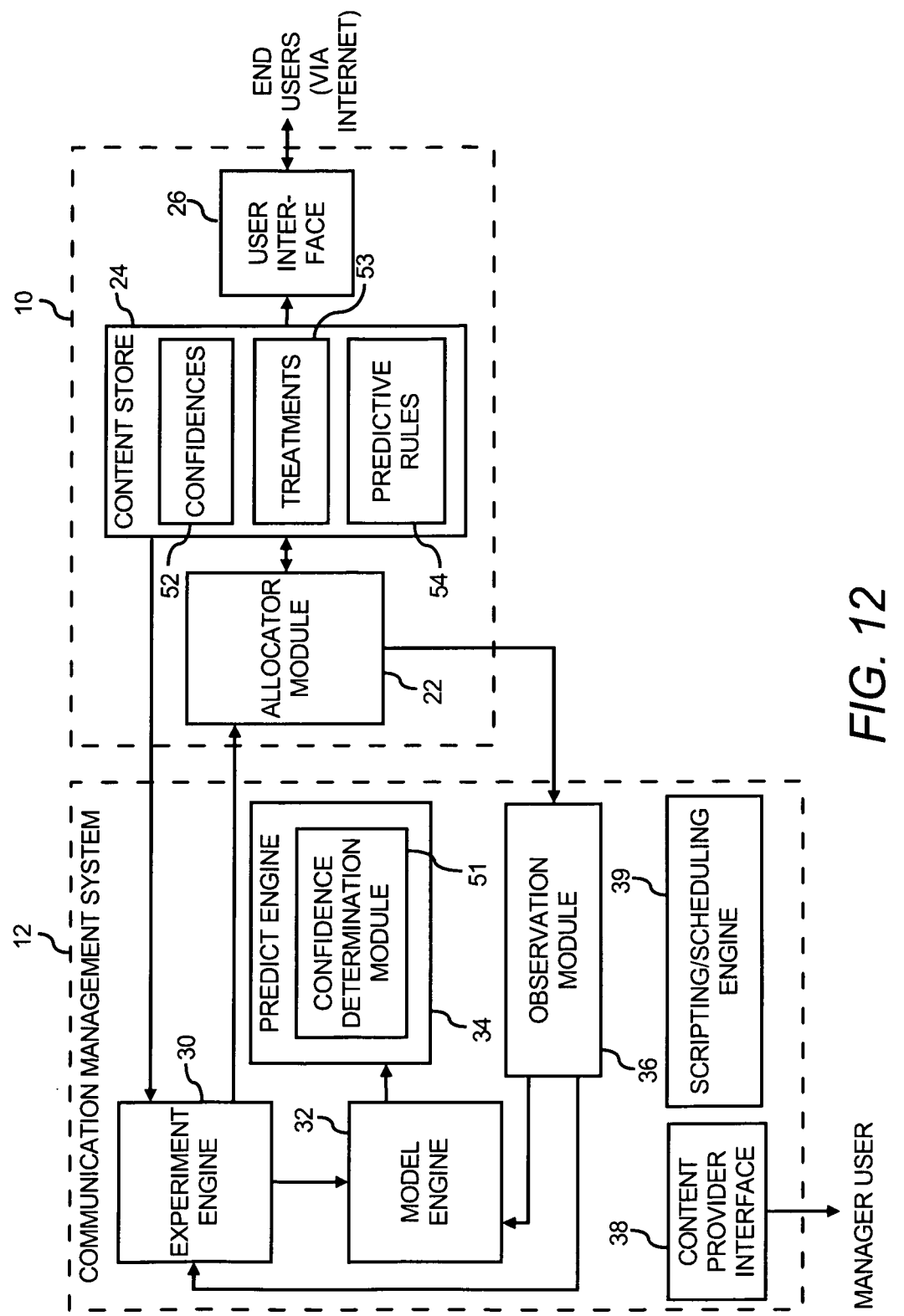
FIG. 12 is a block diagram for a content system and a communication management system including a module for confidence determination, according to an embodiment of the present invention.

FIG. 12 illustrates an embodiment of the system shown in FIG. 2, which is configured to perform optimal selection and delivery of treatments based on confidences. The system shown in FIG. 12 may include all or most of the elements in FIG. 2. Some of the elements are further configured to perform the optimization, whereas other elements operate in the manner described with respect to FIG. 2.

The model engine 32 determines predictive models, which are used to select treatments for the experiment, and the prediction engine 34 determines the predictive rules for selecting treatments. According to an embodiment, the prediction engine 34 also determines a confidence for each treatment delivered to the control groups based on the observation data of control groups receiving the treatments. For example, the prediction engine 34 includes a confidence determination module 51. The confidence determination module 51 may be included in the model generator 50. The confidence determination module 51 uses statistical analysis to quantify how well the delivered treatment satisfied the objective based on the observation data. It will be apparent to one of ordinary skill in the art that the confidence determination module 51 may be provided in other areas of the system.

Each treatment delivered to the control groups may include a combination of content elements, and a confidence is determined for the treatment or for the combination of content elements in the treatment. Note that a treatment may also have a single content element, and thus a confidence may be determined for the single content element.

A combination of elements in a treatment is described as follows. Each content element may constitute a factor to be considered and analyzed, and each content element can be characterized by a type and a variation. For example, consider a case in which there are two types of content elements: a banner advertisement and a text message which can be displayed below the banner advertisement. Each content element may have variations. For the banner advertisement, the variations can be static and moving and different color backgrounds and text. For the text message advertisement, the variations can be different color text. An example of a combination of content elements for the banner advertisement includes a moving banner advertisement with a particular background color (e.g., yellow) and text color (e.g., orange).

A treatment including a moving banner advertisement with orange text and a yellow background is delivered over a network to one or more control groups, each comprising one or more users. The interaction of the users with the treatment in each control group is captured. In a simple case, the objective is to maximize the number of users that click on the advertisement. The observation module 36 stores an indication of the users that clicked on the banner advertisement. This number of users clicking on the banner advertisement may be used by the confidence determination module 51 to determine a confidence for the banner advertisement. The confidence is stored along with an indication of the treatment and the treatment's combination of elements. The indication of the treatment may include a unique ID for the treatment and a description of the content elements in the treatment. The indication of the combination of elements may identify the content element type and the particular variation of the type for each element in the combination. In this example, it would be a banner advertisement type with variations comprising moving, yellow background and orange text. Confidences are determined for each treatment and are stored. The confidences may be stored at the model engine 32 and sent to the content store 24, for example, via the prediction engine 34 and the allocator module 22 for storage. The prediction engine 34 may also receive a predictive model from the model engine 32, and generate predictive rules, which are sent to the allocator module 22 for selecting treatments, as described above. FIG. 12 shows confidences 52, treatments 53 and predictive rules 54 stored in the content store 24. The confidences 52 are for treatments that have been delivered to the control groups.

Figure 13:
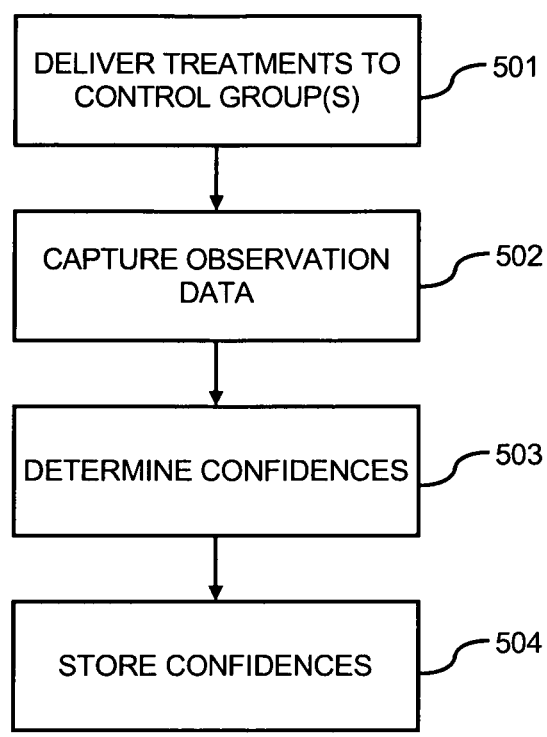
FIG. 13 is a flowchart of an exemplary method for determining and storing confidences, according to an embodiment of the present invention.

FIG. 13 illustrates a method 500 for determining and storing confidences, according to an embodiment. The method 500 is described with respect to the system shown in FIG. 12 by way of example and not limitation. Note that some of the steps of the method 500 are described in other methods herein. Also, one or more of the steps of the method 500 may be part of an overall method for selecting treatments, as is described with respect to a method 600 below.

At step 501, treatments are delivered to one or more control groups, for example, via a network. The treatments may include online content. The content system 10, for example, selects and delivers treatments to the control groups.

At step 502, observation data is captured and stored for delivered treatments. This includes the user interactions with the treatments. The users are in the control groups. The observation module 36 may be used to capture and store the observation data. Observation data may also be stored in the content store 24.

At step 503, confidences are determined for the delivered treatments using the observation data. The confidence determination module 51 shown in FIG. 12 uses the observation data to determine how well the treatment satisfied the one or more objectives. In a simplistic example, where the objective is to maximize the number of clicks on an online advertisement, the confidence may be determined using the size of the control group, and the percentage of users in the control group that clicked on the advertisement. More sophisticated statistical analysis procedures may be used to determine a confidence.

At step 504, the confidences are stored. Each stored confidence may also include an indication of the corresponding delivered treatment and the stored combination of elements of the treatment. By identifying the combination of elements with a confidence, the combination of elements and corresponding confidence can be used to select new treatments to deliver to the control groups during the experiment, as is described in detail below. The method is repeated as different sets of treatments are delivered to control groups and evaluated. The stored confidences may then be used to optimize selection of new treatments to be delivered to the control groups.

Figure 14:
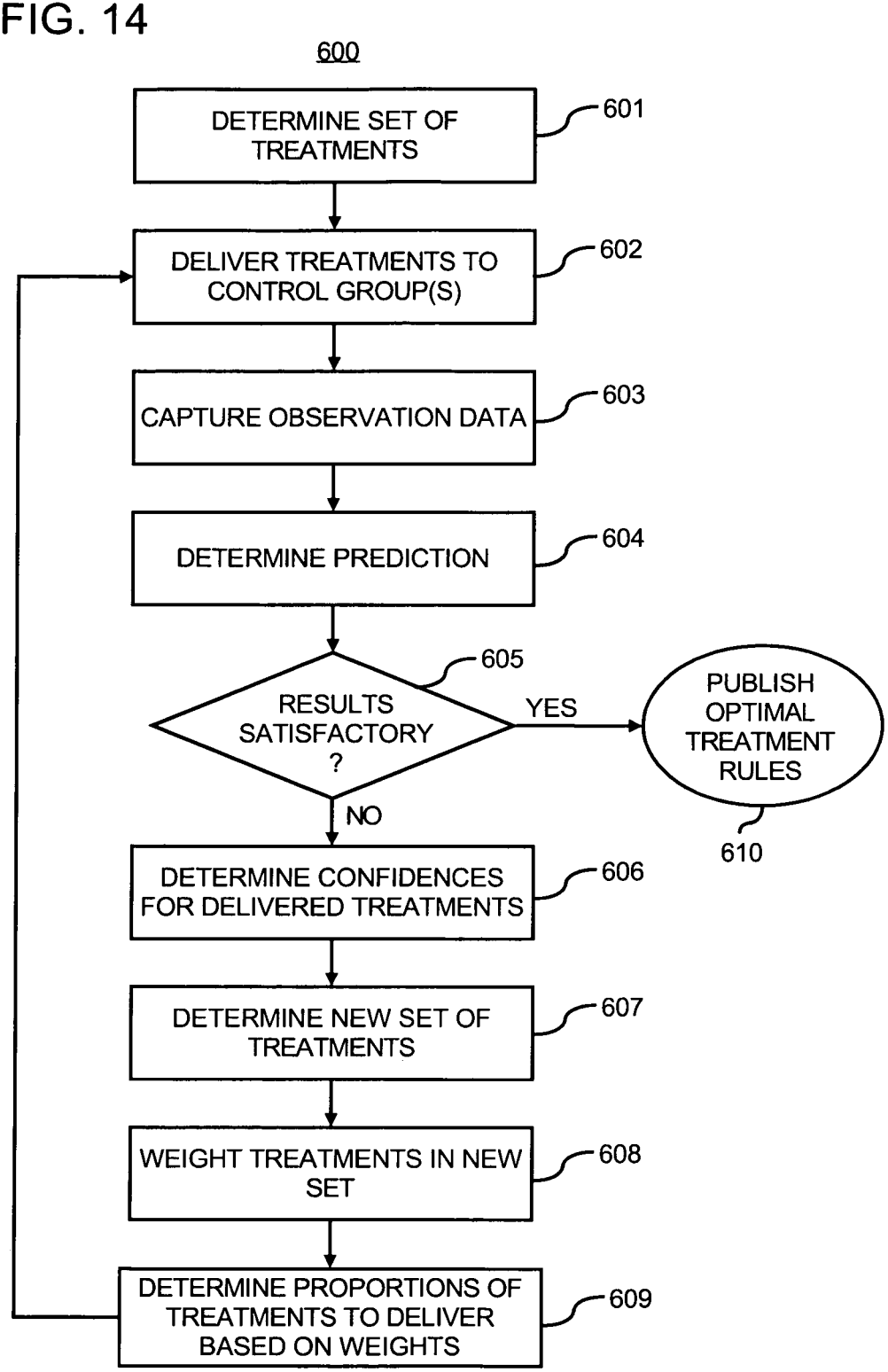
FIG. 14 is a flowchart of an exemplary method for optimized selection of treatments for delivery, according to an embodiment of the present invention.

FIG. 14 illustrates a method 600 for optimized selection and delivery of treatments in an experiment, according to an embodiment. The method 600 is described with respect to the system shown in FIG. 12 by way of example and not limitation.

At step 601, a set of treatments are determined for the experiment. Initially, treatments may be determined by the experiment engine 30. For example, the experiment engine 30 generates treatments based on the experiment definition, stated variations of content elements, and observations in previous experiments. The treatments are stored in the content store 24. A set of treatments is elected from the stored treatments. Subsequently, sets of treatments are determined based on confidences.

At step 602, the set of treatments is delivered to one or more control groups and, at step 603, observation data is captured for the delivered treatments. This is similar to steps 501 and 502 of the method 500 described above. For example, treatments are delivered to one or more control groups via a network. The observation data is captured and stored for delivered treatments. This includes the user interactions with the treatments. The users are in the control groups. The observation module 36 may be used to capture and store the observation data. Observation data may also be stored in the content store 24.

At step 604, a prediction is determined using the observation data. The prediction is an estimation of how users will react to certain treatments based on past behavior of users of similar characteristics. The model engine 32 and the prediction engine 34 may be used to generate the prediction. For example, the model engine 32 analyzes the observation data to generate a prediction model, and the prediction engine 34 uses the prediction model to generate predictive rules for selecting treatments. Steps 404 and 406 of the method 400 shown in FIG. 4 describe generating the prediction model and predictive rules in further detail.

At step 605, the communication management system 12 determines whether the observed results are satisfactory. This is similar to step 120 shown in FIG. 8. For example, the communication management system 12 determines whether users in the control groups have reacted in the desired manner to the content treatments which were delivered, thus achieving the desired outcomes or objectives. This determination is performed based on the prediction model. If the observed results are not satisfactory, then new treatments are selected as described in the following steps starting at step 606. If the observed results are satisfactory, then, at step 610, the experiment is finished. The optimal treatments (i.e., the best choices of available content) may then be returned to new visitors, and optimal treatment rules may be published. The optimal treatment rules can be used for selecting and delivering optimal treatments to new visitors.

At step 606, confidences for the treatments in the set are determined using the observation data, and the confidences are stored, such as described in steps 503 and 504 in the method 500.

At step 607, a new set of treatments is determined based on the confidences. Confidences and the predictive model and predictive rules may be used to select a new set of treatments. Similar to step 116 in FIG. 8, the allocator module 22 applies the predictive rules to select a new set of treatments, for example, from the content store 24.

According to an embodiment, the new set of treatments are selected from a group of candidate treatments. Thus, prior to selecting the new set of treatments, a group of candidate treatments is determined. A treatment is selected to be a candidate treatment based on its confidence and using other criteria. As described above, confidences for treatments are determined. Confidences may be stored with the treatments, or confidences are stored for corresponding combinations of elements and are matched with the treatments according to the combination of elements in each treatment.

In one example, treatments having confidences below a threshold are dismissed and not selected as a candidate treatment. The threshold may be a relatively low threshold that is used to identify treatments that clearly would not be able to satisfy an objective of the experiment. Treatments having confidences above the threshold are selected as candidate treatments. These candidate treatments are used in the new set of treatments identified at step 607.

At step 608, a weight is determined for each candidate treatment. For example, a weighting is calculated by the prediction engine 34 for each candidate treatment. The weighting may be such that higher confidences are given higher weights.

At step 609, a proportion of candidate treatments for delivery is determined based on the weights. For example, to optimize the selection of treatments to deliver to the control group that are estimated to have the best ability to achieve the objective of the experiment, the candidate treatments having higher confidences are delivered to the control groups in greater proportion to candidate treatments having lower confidences.

In one example, confidences are determined for combinations of elements, and the combinations of elements are weighted. Treatments having combinations of elements corresponding to the higher-weighted combinations are selected from the content store 24 and are delivered in greater proportion than treatments having the lower-weighted combinations of elements.

A confidence may be determined in error. For example, a treatment is inaccurately given a low confidence. As the treatment is re-delivered to the control groups over time, the treatment will automatically be given a higher confidence, because that treatment will continue to be selected by the users of the control groups. Thus, the weighting procedure provides for automatic confidence correction.

Steps of the method 600 are repeated until treatments are identified that satisfy the objective of the experiment. The method 600 should reduce the amount of time to identify treatments that satisfy the objective through the steps for the optimal selection process of treatments for the new set.

Computer System Diagram Including Computer Readable Medium

Figure 15:
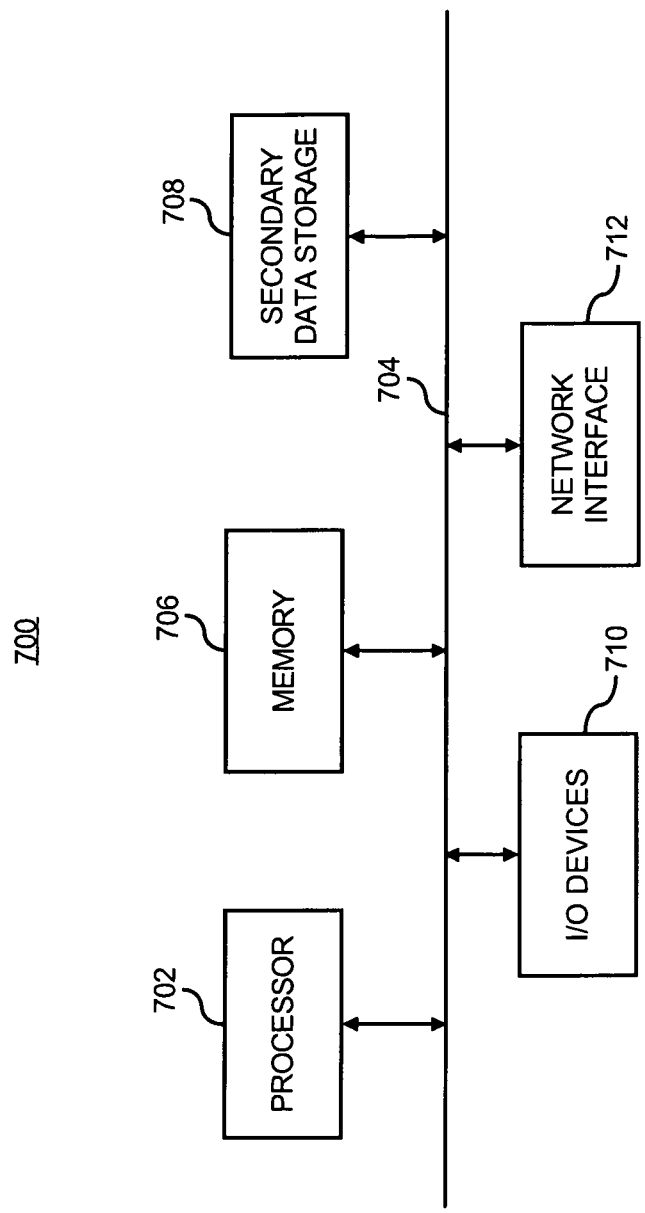
FIG. 15 is a block diagram of a computer system including a computer readable medium that is configured to store one or more computer programs implementing one or more of the methods and other steps described herein, according to an embodiment of the present invention.

FIG. 15 shows a computer system 700 that may be used with the embodiments described herein. The computer system 700 represents a generic platform that includes components that may be in a user device or may be in a server for a service provider. The computer system 700 may be used as a platform for executing one or more of the methods, functions and other steps described herein.

The computer system 700 includes a processor 702 that may implement or execute software instructions performing some or all of the methods, functions and other steps described herein. The software is stored in a computer readable storage medium, such as main memory 706 and/or secondary data storage 708. Commands and data from the processor 702 are communicated over a communication bus 704. The computer system 700 also includes the main memory 706, such as a random access memory (RAM), where the software and data for processor 702 may reside during runtime, and the secondary data storage 708, which may be non-volatile and stores software and data. The memory and data storage are examples of computer readable mediums.

The computer system 700 may include one or more I/O devices 710, such as a keyboard, a mouse, a display, etc. The computer system 700 may include a network interface 712 for connecting to a network. It will be apparent to one of ordinary skill in the art that other known electronic components may be added or substituted in the computer system 700.

While the embodiments have been described with reference to examples, those skilled in the art will be able to make various modifications to the described embodiments without departing from the scope of the claimed embodiments.

What is claimed is:

1. A method for conducting an experiment over a data network, the method comprising:
   determining a first set of advertisement treatments to be delivered to a control group over the network for the experiment, wherein each advertisement treatment includes a combination of content elements including at least one of text, image, audio and video;
   delivering the first set of advertisement treatments to the control group over the network;
   tracking behavior of the control group as the control group is presented with at least one of the advertisement treatments in the first set;
   determining a prediction of how users in the control group will react to certain advertisement treatments based on past behavior of users of similar characteristics;
   determining whether the tracked behavior for the control group is satisfactory based on the prediction for the control group, wherein the tracked behavior is determined to be satisfactory when the users of the control group reacted as predicted by the prediction in response to being presented with the least one treatment, otherwise the tracked behavior is determined to be not satisfactory;
   when the tracked behavior is determined as not satisfactory for the control group,
      determining a confidence for each advertisement treatment of the first set based on the tracked behavior, wherein each confidence is an estimation of an ability of the corresponding advertisement treatment or the combination of content elements in the corresponding advertisement treatment to be used to satisfy one or more objectives of the experiment, and wherein each confidence is determined using a size of the control group and a percentage of users in the control group that satisfied one or more objectives of the experiment;

storing the confidences for the first set of advertisement treatments and any other advertisement treatments delivered to the control group; and determining, by a computer processor, a new set of advertisement treatments to deliver to the control group based at least on the confidences, wherein determining the new set of advertisement treatments to deliver to the control group based at least on the confidences further comprises:

identifying candidate advertisement treatments for the new set;

determining a confidence for each candidate advertisement treatment;

weighting each candidate advertisement treatment based on the corresponding confidence; and selecting the candidate advertisement treatments for the new set based on the weightings; and when the tracked behavior is determined as satisfactory for the control group, ending the experiment.

2. The method of claim 1, further comprising:

determining a proportion of the candidate advertisement treatments for the new set to deliver to the control group based on the weightings.

3. The method of claim 2, wherein candidate advertisement treatments determined to have higher weightings as a result of having higher confidences are delivered in higher proportion to the control group than candidate advertisement treatments determined to have lower weightings.

4. The method of claim 2, further comprising:

using a confidence threshold to determine advertisement treatments not to include in the new set.

5. The method of claim 1, wherein determining a confidence for each candidate advertisement treatment of the new set of advertisement treatments further comprises:

retrieving a stored confidence for each candidate advertisement treatment of a previous set of advertisement treatments.

6. The method of claim 1, wherein each advertisement treatment comprises a combination of elements, and each element includes a variation of a plurality of variations for the element.

7. The method of claim 1, wherein the determining of a new set of advertisement treatments to deliver to the control group based at least on the confidences further comprises:

determining the new set of advertisement treatments based on another prediction of which candidate advertisement treatments are to achieve the one or more objectives.

8. The method of claim 7, further comprising:

determining a predictive model from observed behavior of control groups; and determining the another prediction from the predictive model.

9. The method of claim 1, wherein the new set of advertisement treatments include one or more advertisement treatments having a same combination of elements of at least one advertisement treatment in the first set determined to have a high confidence relative to other advertisement treatments previously delivered to the control group.

10. The method of claim 1, further comprising:

determining whether the one or more objectives are satisfied; and repeating the determining of a new set of advertisement treatments based on confidences for previously delivered advertisement treatments if the one or more objectives are not satisfied.

11. A system to conduct an experiment for evaluating content, the system comprising:

a content system to:

store content, the content comprising advertisement treatments to be delivered to a control group, each advertisement treatment having a combination of content elements including at least one of text, image, audio and video; and a communication management system in communication with the content system, the communication management system to:

define the experiment, conduct the experiment by delivering a first set of advertisement treatments of the stored advertisement treatments to the control group over a data network, collect, over the data network, observation data from the control group, the observation data relating to user behavior for each advertisement treatment, determine a prediction of how users in the control group will react to certain advertisement treatments based on past behavior of users of similar characteristics;

determine whether the user behavior for the control group is satisfactory based on the prediction for the group, wherein the user behavior is determined to be satisfactory when the users of the control group reacted as predicted by the prediction in response to being presented with the first set of advertisement treatments, otherwise the user behavior is determined to be not satisfactory;

when the user behavior is determined as not satisfactory for the control group, determine a confidence for each advertisement treatment of the first set based on the user behavior, wherein each confidence is an estimation of an ability of the corresponding advertisement treatment or the combination of content elements in the corresponding advertisement treatment to be used to satisfy one or more objectives of the experiment, and wherein each confidence is determined using a size of the control group and a percentage of users in the control group that satisfied one or more objectives of the experiment, wherein the content system is further to select new advertisement treatments to deliver to the control group for the experiment based on the determined confidences of the advertisement treatments delivered to the control group, wherein to select new advertisement treatments, the content system is to:

identify candidate advertisement treatments for the new set;

determine a confidence for each candidate advertisement treatment;

weight each candidate advertisement treatment based on the corresponding confidence; and select the candidate advertisement treatments for the new set based on the weightings, and when the user behavior is determined as satisfactory for the control group, the communication management system ending the experiment.

12. The system of claim 11, wherein the content system is to determine a proportion of the candidate advertisement treatments to deliver to the control group based on weightings of the candidate advertisement treatments determined from the confidences of the candidate advertisement treatments.

13. The system of claim 12, wherein the proportion identifies a ratio of higher to lower confidences for advertisement treatments to be delivered.

14. The system of claim 11, wherein the communications management system determines another prediction to select the new advertisement treatments.

15. One or more computer readable mediums storing computer code executable by a computer system, the code to:
- determine a first set of advertisement treatments to be delivered to a control group over a network for an experiment, wherein each advertisement treatment includes a combination of content elements including at least one of text, image, audio and video;
- deliver the first set of advertisement treatments to the control group over the network;
- track behavior of the control group as the control group is presented with at least one of the advertisement treatments in the first set;
- determine a prediction of how users for the control group will react to certain advertisement treatments based on past behavior of users of similar characteristics;
- determine whether the tracked behavior for the control group is satisfactory based on the prediction for the control group, wherein the tracked behavior is determined to be satisfactory when the users of the control group reacted as predicted by the prediction in response to being presented with the at least one treatment, otherwise the tracked behavior is determined to be not satisfactory;
- when the tracked behavior is determined as not satisfactory for the control group,
  - determine a confidence for each advertisement treatment of the first set based on the tracked behavior, wherein each confidence is an estimation of an ability of the corresponding advertisement treatment to be used to satisfy one or more objectives of the experiment, and wherein the confidence for each advertisement treatment to be used is determined using a size of the control group and a percentage of users in the control group that satisfied one or more objectives of the experiment;
  - store the confidences for the first set of advertisement treatments and any other advertisement treatments delivered to the control group; and
  - determine a new set of advertisement treatments to deliver to the control group based at least on the confidences, wherein code to determine a new set of advertisement treatments to deliver to the control group based at least on the determined confidences is to:
    - identify candidate advertisement treatments for the new set;
    - determine a confidence for each candidate advertisement treatment;
    - weight each candidate advertisement treatment based on the corresponding confidence; and
    - select the candidate advertisement treatments for the new set based on the weightings; and
- when the tracked behavior is determined as satisfactory for the control group, ending the experiment.

16. The one or more computer readable mediums of claim 15, wherein the code is to:
- determine a proportion of the candidate advertisement treatments for the new set to deliver to the control group based on the weightings.

17. The one or more computer readable mediums of claim 16, wherein advertisement treatments determined to have higher weightings as a result of having higher confidences are delivered in higher proportion to the control group than advertisement treatments determined to have lower weightings.

* * * * *